(12) United States Patent
Benedek et al.

(10) Patent No.: US 10,163,256 B2
(45) Date of Patent: Dec. 25, 2018

(54) METHOD AND SYSTEM FOR GENERATING A THREE-DIMENSIONAL MODEL

(71) Applicant: MTA Szamitastechnikai Es Automatizalasi Kutato Intezet, Budapest (HU)

(72) Inventors: Csaba Benedek, Koszeg (HU); Dmitrij Csetverikov, Budapest (HU); Zsolt Janko, Budapest (HU); Tamas Sziranyi, Budapest (HU); Attila Borcs, Komarom (HU); Oszkar Jozsa, Adasztevel (HU); Ivan Eichhardt, Baja (HU)

(73) Assignee: MTA Szamitastechnikai Es Automatizalasi Kutato Intezet, Budapest (HU)

( * ) Notice: Subject to any disclaimer, the term of this patent is extended or adjusted under 35 U.S.C. 154(b) by 235 days.

(21) Appl. No.: 14/892,139

(22) PCT Filed: Feb. 14, 2014

(86) PCT No.: PCT/HU2014/000017
§ 371 (c)(1),
(2) Date: Nov. 18, 2015

(87) PCT Pub. No.: WO2014/188225
PCT Pub. Date: Nov. 27, 2014

(65) Prior Publication Data
US 2016/0093101 A1    Mar. 31, 2016

(30) Foreign Application Priority Data

May 23, 2013 (HU) ..................................... 1300328

(51) Int. Cl.
*G06K 9/00* (2006.01)
*G06T 7/11* (2017.01)
(Continued)

(52) U.S. Cl.
CPC .......... *G06T 17/10* (2013.01); *G06K 9/00201* (2013.01); *G06T 7/11* (2017.01); *G06T 7/194* (2017.01)

(58) Field of Classification Search
CPC ..................................................... G06T 17/10
See application file for complete search history.

(56) References Cited

U.S. PATENT DOCUMENTS

| 2004/0105573 A1 | 6/2004 | Neumann et al. |
| 2006/0066614 A1* | 3/2006 | Grau .................. G06K 9/00201 345/423 |

(Continued)

OTHER PUBLICATIONS

W.W. Yu, F. He, P. Xi, A rapid 3D seed-filling algorithm based on scan slice, Computers and Graphics, 34 (4) (2010), pp. 449- 459.*

(Continued)

*Primary Examiner* — Kee M Tung
*Assistant Examiner* — Grace Q Li
(74) *Attorney, Agent, or Firm* — Wood Herron & Evans LLP

(57) ABSTRACT

The invention is a method for generating a three-dimensional model, said method comprising generating (S100), by means of a scanning device, a point set corresponding to a scene comprising at least one object shape, dividing (S120) the point set corresponding to the scene into a foreground point set corresponding to a foreground of the scene, and comprising a subset corresponding to the at least one object shape of the point set corresponding to the scene, and a background point set corresponding to a background of the scene, separating (S130) from the foreground point set, at least one object shape subset corresponding to each of the at least one object shape, respectively, generating (S140) a background three-dimensional model on the basis of the background point set, generating (S150) from optical recordings a three-dimensional model of at least one sub- (Continued)

stituting object shape assignable to each of the at least one object shape, respectively, and generating (S160) a combined three-dimensional model on the basis of the background three-dimensional model and the three-dimensional model of at least one substituting object shape substituting each of the at least one object shape subset, respectively. Furthermore, the invention is a system for generating a three-dimensional model.

11 Claims, 17 Drawing Sheets

(51) Int. Cl.
*G06T 17/10* (2006.01)
*G06T 7/194* (2017.01)

(56) References Cited

U.S. PATENT DOCUMENTS

| | | | | |
|---|---|---|---|---|
| 2006/0190228 | A1* | 8/2006 | Johnson | G06F 17/5004 703/13 |
| 2007/0255480 | A1* | 11/2007 | Southall | B60T 7/22 701/96 |
| 2008/0050011 | A1* | 2/2008 | Ofek | G06T 17/05 382/154 |
| 2009/0009513 | A1* | 1/2009 | van den Hengel | G06T 17/20 345/420 |
| 2009/0185741 | A1* | 7/2009 | Nahari | G06K 9/0063 382/154 |
| 2009/0281566 | A1* | 11/2009 | Edwards | A61B 6/541 606/214 |
| 2010/0217529 | A1* | 8/2010 | Stroila | G01S 17/89 702/5 |
| 2010/0250185 | A1* | 9/2010 | Marshall | G01V 7/00 702/152 |
| 2012/0121166 | A1* | 5/2012 | Ko | G06K 9/00234 382/154 |
| 2013/0300740 | A1* | 11/2013 | Snyder | G06F 3/016 345/420 |
| 2013/0342877 | A1* | 12/2013 | Askan | G06T 17/00 358/463 |
| 2015/0160332 | A1* | 6/2015 | Sebastian | G01S 17/023 356/5.04 |

OTHER PUBLICATIONS

Morton, Peter, Bertrand Douillard, and James Underwood. "An evaluation of dynamic object tracking with 3d lidar." Proc. of the Australasian Conference on Robotics & Automation (ACRA). 2011.*
Magnusson, Martin. The three-dimensional normal-distributions transform: an efficient representation for registration, surface analysis, and loop detection. Diss. Örebro universitet, 2009.*
Hungarian Intellectual Property Office, Search Report in Hungarian Patent Application No. P1300328, dated Feb. 10, 2017, 2 pp., with first page listing 3 references, one of which is already cited.
Horváth Csaba et al., MRF alapú előtérdetekcióés objektumkövetés Lidar pontfelhő szekvenciákon, published Feb. 2014, KÉPAF 2013—a Képfeldolgozók és Alakfelismerők Társaságának 9. országos konferenciája.
Benedek Csaba et al, A Dynamic MRF Model for Foreground Detection on Range Data Sequences of Rotating Multi-beam Lidar Nov. 11, 2012, Institute for computer Science and Control, Hungarian Academy of Sciences, Heidelberg, Berlin.
Fabio Remondino, Heritage REcording and 3D Modeling with Photogrammetry and 3D Scanning, May 30, 2011, pp. 1104-1138, XP55135663, Remote Sensing, vol. 3, No. 12, Trento, Italy.

* cited by examiner

Shape1  Shape2

Shape1  Shape2

Shape1         Shape2
Height = 175cm Height = 190cm

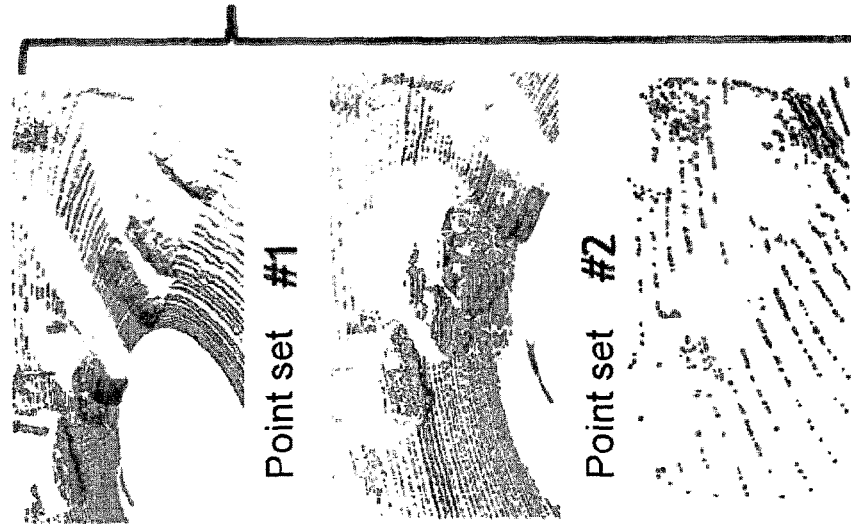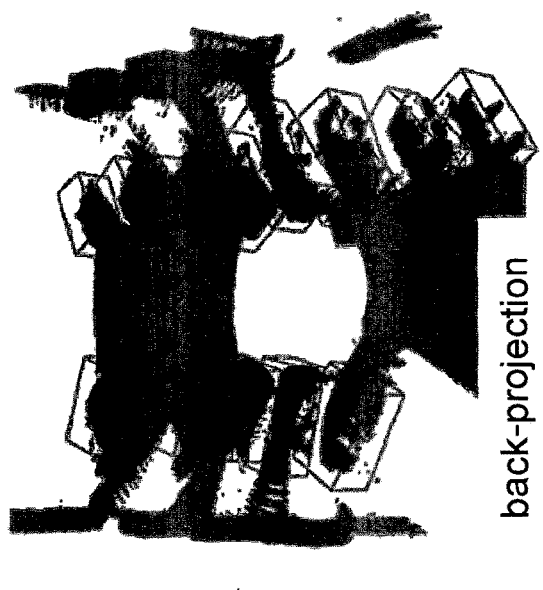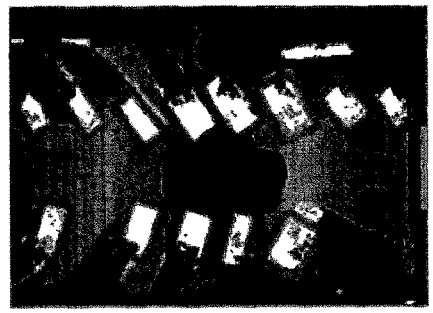
Fig. 23

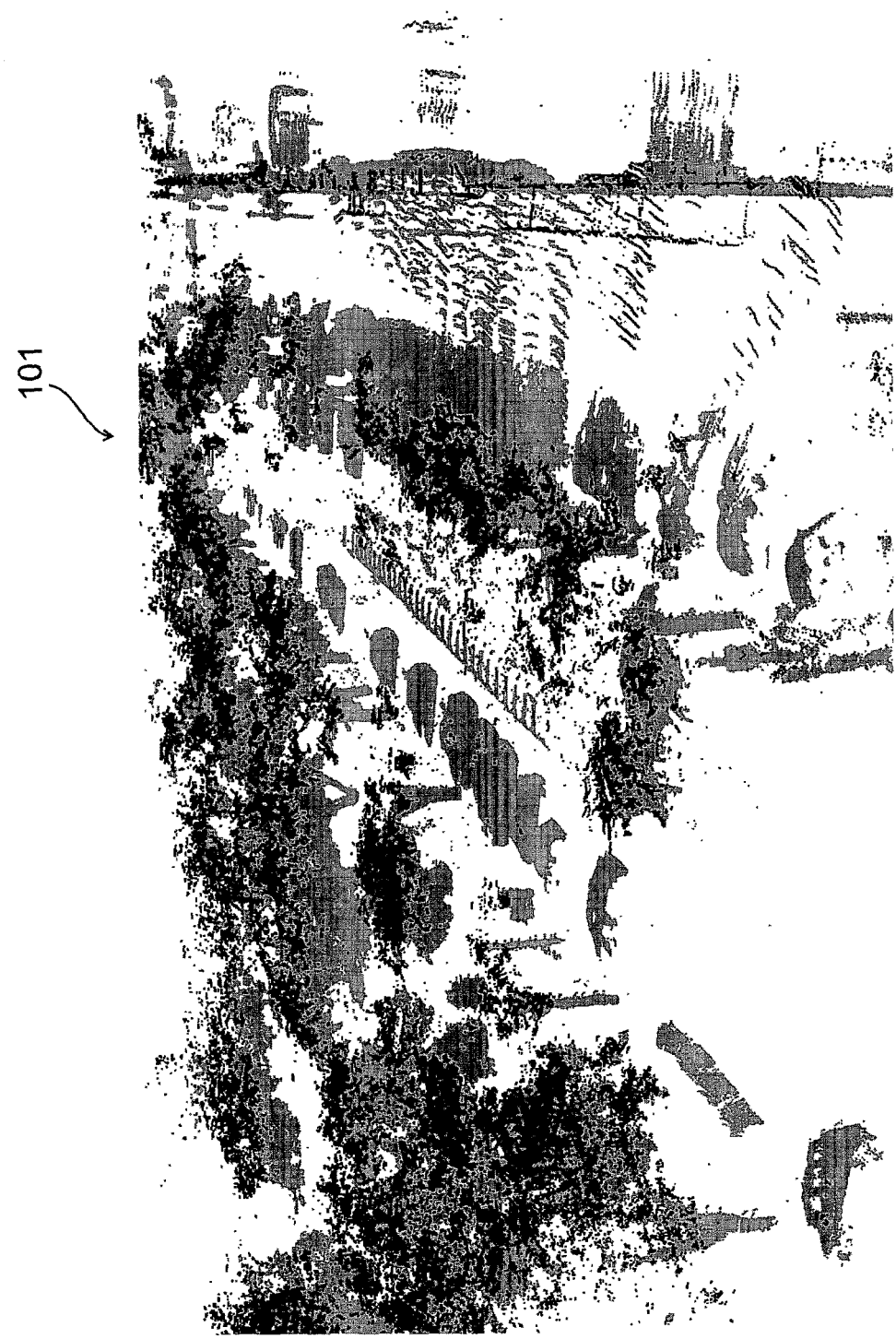

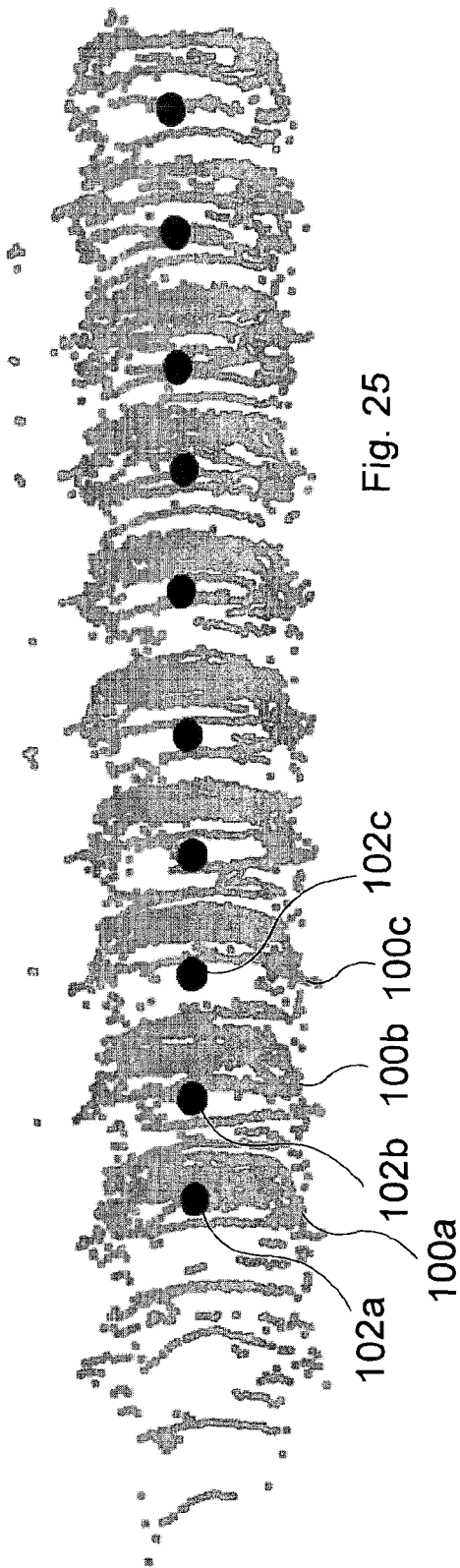

METHOD AND SYSTEM FOR GENERATING A THREE-DIMENSIONAL MODEL

This application claims priority, under Section 371 and/or as a continuation under Section 120, to PCT Application No. PCT/HU2014/000017, filed on Feb. 14, 2014, which claims priority to Hungarian Application No. P1300328, filed on May 27, 2013.

TECHNICAL FIELD

The invention is a method and a system for generating a three-dimensional model of a scene comprising at least one object shape.

BACKGROUND ART

The efforts aimed at reconstructing three-dimensional dynamic scenes are especially significant in the fields of intelligent remote surveillance (Roth, P., Settgast, V., Widhalm, P., Lancelle, M., Birchbauer, J., Brandle, N., Havemann, S., Bischof, H.: Next-generation 3D visualization for visual surveillance. *IEEE International Conference on Advanced Video and Signal-Based Surveillance (AVSS)*, 2011 pp. 343-348), video-communication and the so-called augmented reality systems. If real events are available in realistic 4D, i.e. a three-dimensional video flow varying in time, this provides the observer a substantially enhanced visual enjoyment compared to conventional video flows, because a reconstructed 4D scene can be watched from any viewpoint and can be altered virtually by the user. However, constructing an interactive 4D video system poses an extremely tough challenge, because it requires the automatic perception, processing and real time presentation of the environment simultaneously.

A so-called 4D reconstruction studio is an environment fitted with advanced intelligent sensors, and it uses several synchronised and calibrated high resolution video cameras and GPUs (Graphics Processing Units) to build a dynamic 3D, i.e. 4D, model, which provides a real time video flow with arbitrary viewpoint. A 4D reconstruction studio is described by way of example in the papers of Hapák J., Jankó Z., Chetverikov D.: Real-time 4D reconstruction of human motion. *Proc. 7th International Conference on Articulated Motion and Deformable Objects (AMDO 2012)*. Springer LNCS, vol. 7378, pp. 250-259 (2012) and Blajovici, C., Chetverikov, D., Jankó, Z.: 4D studio for future internet: Improving foreground-background segmentation. In: *IEEE International Conference on Cognitive Infocommunications (CogInfoCom)*. pp. 559-564. (2012). The described 4D studio is able to record and display efficiently the model of a single moving person, but it is not adapted for 'covering' and recording such large scenes, which have many moving persons and various background objects.

A paper (Kim, H., Guillemaut, J. Y., Takai, T., Sarim, M., Hilton, A.: Outdoor dynamic 3-d scene reconstruction. *IEEE Trans. on Circuits and Systems for Video Technology*, Vol. 22, pp. 1611-1622 (2012)) describes a portable stereo system adapted for the surveillance of outdoor scenes, which is able to make recordings of dynamic outdoor scenes and to spatially reconstruct of the scenes. In this system, the examined space or scene is to be surrounded by many, characteristically 8 or 9 well-calibrated cameras prior to the recording, and the reconstruction process is extremely computer intensive, the processing of roughly 10-second footage takes several hours. In addition, full automation runs into difficulties, because of the conventionally experienced so-called occlusion problems in stereo reconstruction and due to the locally missing adaptable image characteristics.

The so-called ToF (Time-of-Flight) method applied for example in so-called LIDAR (Light Detection and Ranging) devices, offers considerable advantages over conventional video flows in the field of automated scene analysis, because from the principally 2.5 dimensional range data set provided by this device, the geometrical information can be obtained directly. The 2.5 dimensional distance data imply that LIDAR only provides information about the LIDAR facing side of the examined objects. And furthermore, the experiments performed by LIDAR are much less sensitive to the climatic and lighting conditions in the course of data acquisition than the outdoor systems based on optical recordings.

High speed Rotating Multi-Beam laser scanning devices, i.e. RMB LIDAR devices like, e.g. the Velodyne HDL-64E device, are able to provide spatial point cloud and point set series. However, the scan obtained by rotating the RMB LIDAR once yields a rare point cloud, and a significant drop of sampling density can be experienced especially at larger distances from the sensor. In addition, a circular pattern is observable around the LIDAR device, where the distance between the points of circles is much smaller than the distance between the points of neighbouring circles (see Behley, J., Steinhage, V., Cremers, A.: Performance of histogram descriptors for the classification of 3D laser range data in urban environments. In: *IEEE International Conference on Robotics and Automation (ICRA)*, pp. 4391-4398 (2012)). These characteristics lead to an inferior visual experience, if only the raw point cloud series are displayed on a screen.

Such systems and methods are known, in which laser scanning and optically obtained recordings are applied simultaneously. These systems and methods are described in US 2012/0081544 A1, WO 2011/120141 A1, US 2010/0125812 A1, WO 01/10138 A1, US 2010/0183192 A1 and US 2010/0315505 A1. Most of these systems make a laser and optical recording of the same space, in order to obtain a spatial reconstruction of as high a quality as possible.

The examination of vegetation by a LIDAR device is described in AU 2012227155 A1. LIDAR-based systems are described in US 2013/0016896 A1, DE 10 2009 046 597 A1 and U.S. Pat. No. 8,368,876 B1. A surveillance system based on video cameras is described in US 2008/0152192 A1, US 2009/0232353 A1 and US 2010/0002074 A1.

An educational paper about a research project associated with this invention is Dániel Gergő Pintér's Új utakon a dinamikus várostervezés (New ways of dynamic city planning, *Élet és Tudomány* magazine, Volume LXVIII, No. 12, pp. 378-379 (2013)) which mentions that it is desirable to insert object shape models generated by a 4D studio in street view models, but the steps taken to insert such models are not presented in the paper.

In view of known solutions, there is a demand for such a method and system, by which the three-dimensional model of a scene can be prepared substantially in real time in a way that object shapes being relevant from the aspect of the scene and located in the foreground—for example stationary or moving people, cars or other important shapes or certain static objects—have a detailed texture, while the background parts being not so much important from the aspect of the scene have a more schematic texture.

DESCRIPTION OF THE INVENTION

The primary object of the invention is to provide such a method and a system which are free from the disadvantages of prior art solutions to the greatest possible extent.

A further object of the invention is to provide a method and a system by which the three-dimensional model of a scene can be generated substantially, that is almost, in real time in a way that some object shapes, for example, moving people, cars or other significant shapes, significant from the aspect of the scene and located in the foreground of the scene, and the three-dimensional model of some static objects are processed on the basis of optical recordings. Hence, these object shapes in the foreground have a detailed texture, while the less important details in the background are modelled on the basis of a point set corresponding to the scene and obtained by a scanning device. In this description, an object shape means all such persons or objects, who or which are located in the foreground of the examined scene and which, since their high resolution reconstruction is desirable, are substituted by a three-dimensional model generated on the basis of optical recordings.

The invention is a method for generating a three-dimensional model, and in the course of the method a point set corresponding to a scene comprising at least one object shape is generated by means of a scanning device, the point set corresponding to the scene is divided into a foreground point set corresponding to a foreground of the scene, and comprising a subset corresponding to the at least one object shape of the point set corresponding to the scene, and a background point set corresponding to a background of the scene, at least one object shape subset corresponding to each of the at least one object shape, respectively, is separated from the foreground point set, a background three-dimensional model is generated on the basis of the background point set, a three-dimensional model of at least one substituting object shape assignable to each of the at least one object shape, respectively, is generated from optical recordings and a combined three-dimensional model is generated on the basis of the background three-dimensional model and the three-dimensional model of at least one substituting object shape substituting each of the at least one object shape subset, respectively. After dividing the point set corresponding to the scene into a foreground point set and a background point set, the subsets corresponding to the object shapes can be separated very advantageously. Thereby it becomes possible to substitute the object shape subsets with the three-dimensional models of substituting shapes, which models are generated from optical recordings, i.e. the models can be generated with a much higher resolution than in the case of using a point set corresponding to the scene. The combined model obtained by the method according to the invention also lends itself very advantageously to texturing, because the three-dimensional model of the substituting shapes can have a thoroughly detailed texture, even by means of the preferably applied optical studio, while the texturing of the background will only be made to the necessary extent.

In an embodiment of the method according to the invention, the points of the point set corresponding to the scene are classified, on the basis of the height value of the points, into ground category, tall object category, short object category and rare regions category, the points classified in the rare regions category are removed from the point set corresponding to the scene, and the point set corresponding to the scene is divided into a foreground point set and a background point set by assigning the points classified in the ground category and the tall object category to the background point set, and by assigning the points classified in the short object category as a foreground point set. By this method, the division of the point set corresponding to the scene into a foreground point set and a background point set can be carried out advantageously.

In a further embodiment of the method according to the invention, the point set corresponding to the scene is divided by the Dynamic Markov Random Fields method into a foreground point set and a background point set. Division of the point set corresponding to the scene into a foreground point set and a background point set can be carried out advantageously also by this method.

In an embodiment of the method according to the invention, a topographic model is generated by modelling the topographic features of the scene, after the division of the point set corresponding to the scene into a foreground point set and a background point set.

In a further embodiment of the method according to the invention, the topographic model is made on the basis of an approximating plane fitted onto the topographic features of the scene. In the case of a scene with an appropriately flat ground, the topographic model is approximated by a plane.

In a yet further embodiment of the method according to the invention, the topographic model is made on the basis of a parameterised surface which is fitted onto the topographic features of the scene and follows the unevenness of the topographic features. In the case of scenes, where the topographic features are not sufficiently flat, the topographic model is made on the basis of a parameterised surface.

In an embodiment of the method according to the invention, a projected foreground point set is generated by projecting the foreground point set to the topographic model, at least one projected object shape subset corresponding to each of the at least one object shape, respectively, is generated by dividing the projected foreground point set by means of shape filtering and/or dimensional fitting, and the at least one object shape subset is determined on the basis of the at least one projected object shape subset. In the present embodiment of the method, the object shape subsets are generated on the basis of projection to a topographic model.

In a further embodiment of the method according to the invention, the at least one object shape subset is determined by a three-dimensional recursive flood-fill method from the foreground point set. When establishing the method according to the invention, it was determined that the recursive flood-fill method developed for applications other than that of the invention, for two-dimensional arrays, can be advantageously generalised in the examination of point sets corresponding to a three-dimensional scene, and by means of the flood-fill method the object shape subsets can be obtained from the foreground point set.

In a further embodiment of the method according to the invention, a time series of the point set corresponding to the scene is generated by means of a scanning device by arranging the scanning device in a given location, a time series of a location point of the at least one object shape on the topographic model is determined on the basis of the at least one projected object shape subset, and at least one trajectory is determined for each of the at least one object shape on the basis of the time series of the location points. With the method according to the invention, a combined three-dimensional model may be produced on the basis of the static point sets corresponding to the scene, and also on the basis of a time series of static point sets, i.e. a dynamic point set.

In an embodiment of the method according to the invention, the at least one trajectory for at least one object shape is determined by the Magyar method on the basis of the time series of location points.

In an embodiment of the method according to the invention, the at least one trajectory is smoothed. The smoothing of the trajectory is especially advantageous from the aspect of the generated combined three-dimensional model, because without smoothing, as the three-dimensional model of the substituting object always faces the trajectory, the three-dimensional model of the substituting object would undesirably vibrate during the movement along the trajectory, even when the trajectory has a very slight unevenness.

In a further embodiment of the method according to the invention, at least two trajectories are determined, along the at least two trajectories height values and/or intensity values measured by a scanning device of the shapes corresponding to each of the trajectories, respectively, are recorded and one of the at least two trajectories is assigned and linked to another trajectory on the basis of the matching of height values and/or intensity values. In the present embodiment of the method according to the invention, the re-recognition of occluded shapes which cannot be seen in several time levels can be performed.

In another embodiment of the method according to the invention, the weighted centre of the projected object shape subset corresponding to the given object shape is selected as the location point of the at least one object shape.

In an embodiment of the method according to the invention, the at least one trajectory is determined on the basis of the location points, by the cyclical execution of the following steps:
  assigning a next location point in sequence for the at least one object shape,
  correcting the assigned location point after examination with a Kalman-filter, and finalising the corrected location point, and
  making a proposal by means of a Kalman-filter, for the next location point in sequence, for the at least one object shape.
In the present embodiment of the invention, a Kalman-filter is also applied in determining the trajectory, so that the trajectories corresponding to each object shape can be determined in a way less sensitive to the errors experienced in the point set corresponding to the scene.

In an embodiment of the method according to the invention, a time series of the point set corresponding to the scene is generated by means of the scanning device by moving the scanning device, and a registered point set is generated by subjecting at least one part of the members of the time series of the point set corresponding to the scene to point set registration. In the present embodiment of the invention, point sets preferably made by a moving car may also be modelled, and the three-dimensional models of the substituting object shapes may be fitted into the registered point set to substitute the appropriate object shape subsets.

In a further embodiment of the method according to the invention, time stamps are assigned to the members of the time series of the point set corresponding to the scene, and, on the basis of the time stamps, at least one static combined object shape subset, and/or at least one dynamic object shape subset are separated in the registered point set. In the registered point set, the various static and dynamic—i.e. moving—object shapes can be separated preferably on the basis of the time stamps.

In a yet further embodiment of the method according to the invention, the time series of at least one object shape subset is generated on the basis of the time stamps, from the at least one dynamic object shape subset, and a trajectory to the time series of the at least one object shape in the time series of the at least one object shape subset is assigned on the basis of the weighted centres of the at least one object shape subset. In the present embodiment of the invention, the trajectory of a dynamic object shape can be determined in a way other than that of the embodiments above, and the three-dimensional model of the substituting object shape can be substituted to this trajectory.

In an embodiment of the method according to the invention, a dynamic three-dimensional model of the at least one substituting object shape is generated on the basis of the optical recordings, and the combined three-dimensional model is generated on the basis of the background three-dimensional model and the dynamic three-dimensional model of at least one substituting object shape substituting each members of the series of object shape subsets corresponding to the at least one object shape, and being multiplied to a length corresponding to the movement along the trajectory corresponding to the object shape. The dynamic three-dimensional model of the substituting object shape may be placed with an appropriate multiplication on the trajectory corresponding to the object shape in a way that it moves along the whole trajectory. Preferably on the basis of the time series of the point set corresponding to a scene, the velocity of object shapes is stored by for the subsets of each object shape. According to this velocity, the three-dimensional model of the substituting object shape may go along the trajectory with bigger or smaller velocity than the velocity determined by the optical recordings.

In an embodiment of the method according to the invention, a subset corresponding to vegetation of the point set corresponding to the scene is separated on the basis of the distance of the given point from the approximating plane and/or its irregular location and/or its intensity, and removing the subset corresponding to the vegetation from the point set corresponding to the scene. The appearance of each vegetation associated part is undesirable in the combined three-dimensional model and therefore these are preferably removed.

In an embodiment of the method according to the invention, the points of the at least one object shape subset are displayed provided with colouring, after the separation of the at least one object shape subset. In order to examine the point set corresponding to the scene, it can be appropriate to display the point set corresponding to the scene; if the point set corresponding to a scene is displayed after the separation of the object shape subsets, each object shape subset may be provided with colouring.

In a further embodiment of the method according to the invention, in the case of separating several object shapes, the points of each object shape subset are displayed by using a different colour for each.

In a yet further embodiment of the method according to the invention, the optical recordings are made in an optical studio, said optical studio comprising an inner space adapted for accommodating the at least one substituting object shape, optical recording devices adapted for making optical recordings and arranged circularly around the inner space at least in one row on the upper side of the inner space, a background member surrounding the inner space at least partly, and a processing unit adapted for processing the optical recordings and for generating the three-dimensional model of the substituting object shape. It is advantageous to make the optical recordings in an optical studio, because the optical studio meets the conditions of making recordings of an appropriate quality, like for example, resolution and lighting, and furthermore the optical studio is also adapted for the processing of optical recordings and for generating the three-dimensional model of the substituting object shape.

In another embodiment of the method according to the invention, a background three-dimensional model is generated by substituting the at least one subset of a static object of the background point set with the three-dimensional model of the static object. The static objects of the scene are categorized to the background. Various separable static objects may be advantageously substituted by three-dimensional models, which are even readily available.

In a further embodiment of the method according to the invention, the three-dimensional model of at least one substituting object shape and/or the three-dimensional model of the scene background are provided with a texture. The parts of the combined three-dimensional model are preferably provided with a texture.

In an embodiment of the method according to the invention, a laser scanning device, preferably a rotary head laser scanner is applied.

In an embodiment of the method according to the invention, the combined three-dimensional model is displayed.

The invention is furthermore a system for generating a three-dimensional model, said system comprising a scanning device adapted for generating a point set corresponding to a scene comprising at least one object shape, a point set dividing module adapted for dividing the point set corresponding to the scene into a foreground point set corresponding to the foreground of the scene, and comprising a subset corresponding to the at least one object shape of the point set corresponding to the scene, and into a background point set corresponding to the background of the scene, an object shape subset dividing module adapted for dividing the foreground point into each of at least one object shape subset corresponding to the at least one object shape, a background modelling module adapted for generating a background three-dimensional model on the basis of the background point set, an optical model-generating module adapted for generating from the optical recordings a three-dimensional model of at least one substituting object shape assignable to each of the at least one object shape, and a model combining module adapted for generating a combined three-dimensional model on the basis of the background three-dimensional model and the three-dimensional model of at least one substituting object shape substituting each of the at least one object shape subset, respectively.

In an embodiment, the system according to the invention comprises a short-term assignment module adapted for determining trajectories.

In a further embodiment, the system according to the invention comprises a long-term assignment module adapted for determining and linking the corresponding trajectories.

In an embodiment of the system according to the invention, the optical recordings are made in an optical studio, said optical studio comprising an inner space adapted for accommodating at least one substituting object shape, optical recording devices adapted for making optical recordings and arranged circularly around the inner space at least in a row on the upper side of the inner space, a background member surrounding the inner space at least partly, and a processing unit adapted for processing the optical recordings and for generating the three-dimensional model of the substituting object shape.

In a further embodiment of the system according to the invention, the scanning device is a laser scanning device, preferably a rotary head laser scanning device.

BRIEF DESCRIPTION OF THE DRAWINGS

Preferred embodiments of the invention are described below by way of example with reference to the following drawings, where FIG. 23 is a flow chart with drawings depicting an embodiment of the method according to the invention, FIG. 24 is a drawing of a point set corresponding to a scene, where the scene comprises trees as background objects, FIG. 25 is a drawing illustrating the displacement of an object shape subset, FIG. 26A is a drawing illustrating the static nature of an object shape subset, FIG. 26B is a further drawing illustrating the static nature of an object shape subset.

MODES FOR CARRYING OUT THE INVENTION

The method according to the invention is adapted for generating a three-dimensional model, a so-called combined three-dimensional model. The combined three-dimensional model comprises parts reconstructed on the basis of a point set corresponding to a scene generated by a scanning device, and parts modelled by three-dimensional models generated on the basis of optical recordings. In the method according to the invention, the combined three-dimensional model is generated by taking the following steps. First, in an operational step S100, a point set corresponding to a scene is generated by means of a scanning device where the scene comprises at least one object shape. Then, in an operational step S120, the point set corresponding to a scene is divided into a foreground point set comprising a subset of at least one object shape corresponding to the foreground of the scene, and into a background point set corresponding to a scene background. In an operational step S130, from the foreground point set, at least one object shape subset corresponding to each of the at least one object shape, respectively, is separated from the foreground point set. In an operational step S140, the three-dimensional model of the scene background is generated on the basis of the background point set. Then, in an operational step S150, a three-dimensional model of at least one substituting object shape assignable to each of the at least one object shape, respectively, is generated from optical recordings. And finally, in an operational step S160, a combined three-dimensional model is generated on the basis of the background three-dimensional model and the three-dimensional model of at least one substituting object shape substituting each of the at least one object shape subset, respectively. Preferably, the object shape subsets are designed without an overlap.

In the foreground point set, in addition to the subset of at least one object shape, other points originating from noise may also emerge. In the course of the separation as per the discussion above, at least one object shape subset is separated from these further points, and the points stemming from noise are removed from the foreground point set.

Figure 1:
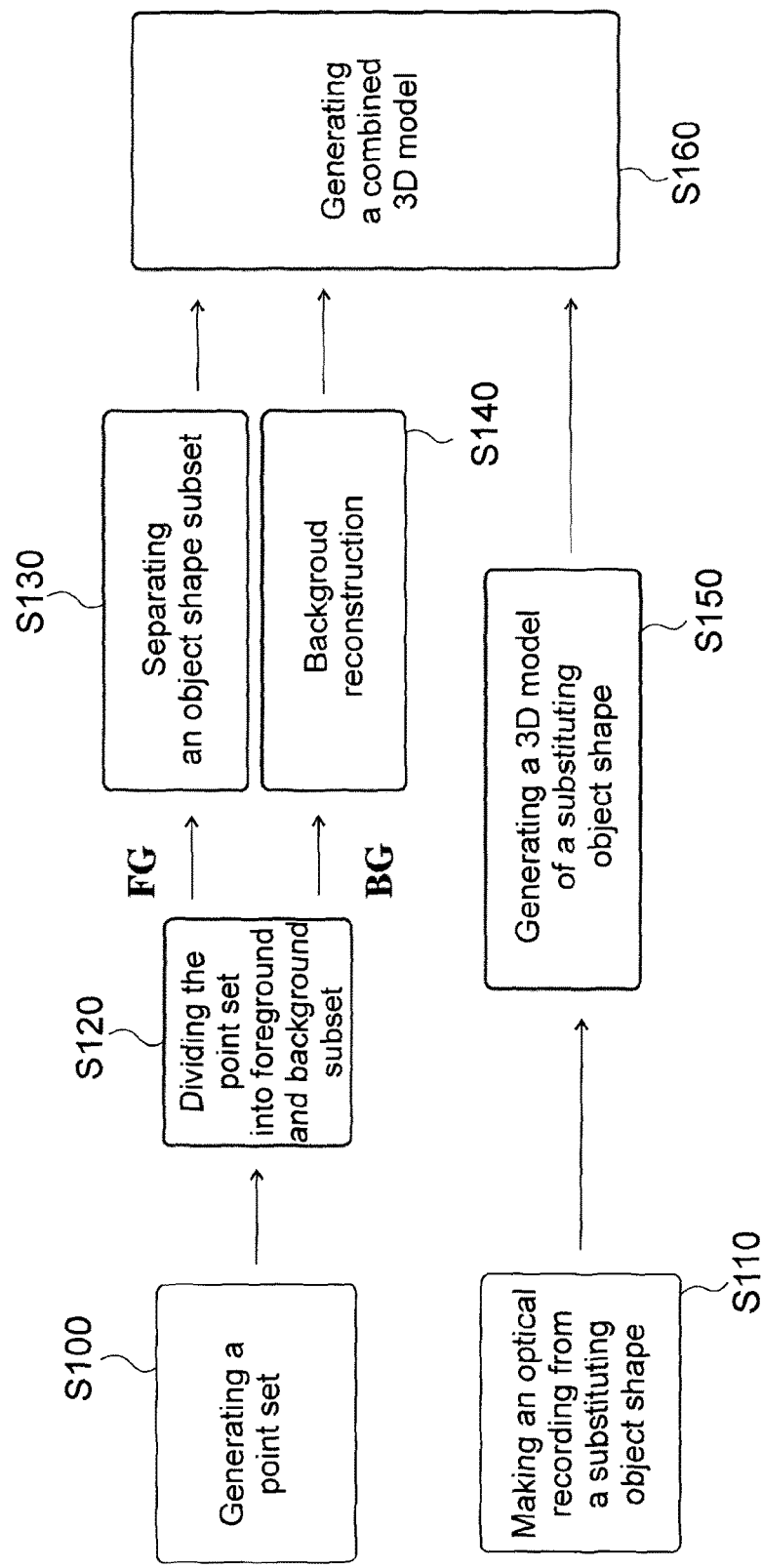
FIG. 1 is a flow diagram illustrating an embodiment of the method according to the invention.

FIG. 1 illustrates an embodiment of the method according to the invention. In the illustrated embodiment, the optical recordings are made in an operational step S110, by way of example in an optical studio to be introduced below. In different embodiments of the method according to the invention, during the procedural steps, already existing optical recordings of an object shape, even those downloaded from a database can be applied.

In some embodiments of the method according to the invention, a rotating multi-beam (RMB) LIDAR device is applied as a scanning device. A rotating multi-beam LIDAR device measures distance data in an angle of vision of 360°, characteristically with a refresh rate of 5 to 20 Hz, which makes the device extremely adapted for the examining of moving objects, even in outdoor scenes of 100 m diameter. The laser transmitter and detector applied in the RMB LIDAR devices turns around with a circular velocity corresponding to the 5 to 20 Hz. By way of example, the LIDAR device comprises 64 transmitters and detectors in a vertical direction, and therefore the information recorded in a given moment may be organised in a 64-component column vector. In one rotation, the LIDAR device makes recordings 1024 times by way of example, i.e. it generates 1024 column vectors. Consequently, in such a rotation, the LIDAR device records a point set consisting of approx. 60 thousand points in the full 360° angle of vision. The LIDAR device converts the distance data into a point set corresponding to a scene in a known manner, and the LIDAR device is located in the centre of the point set. By means of refreshing characterised by its rotation frequency, the rotating multi-beam LIDAR device prepares a time series of the point set corresponding to the scene, concerning the examined scene, and hence by means of such a scanning device, the time-related changes of the scene and the movement of the objects in the scene can be tracked.

A different device providing a point set at its output may also be used as a scanning device, by way of example a device which generates the point set by means of infrared beams. However, it is noted that in the method according to the invention, the most preferred is to use a LIDAR device as a scanning device, because it is the most suitable tool for handling the data in principally real time and it may be reliably used in outdoor scenes.

A paper (Benedek, C., Molnár, D., Szirányi, T.: A dynamic MRF model for foreground detection on range data sequences of rotating multi-beam lidar. In: *International Workshop on Depth Image Analysis, LNCS.* Tsukuba City, Japan (2012)) describes such a method (Dynamic Markov Random Fields method, hereinafter DMRF method), which is adapted for breaking down uneven density and unarranged point sets into a foreground point set and a background point set. The method according to the study is based on a probability approach, by which in the point set time series, a foreground even having dynamic characteristics may be efficiently separated from a principally static background.

In the method according to the invention, the point set corresponding to a scene is divided into a foreground point set and a background point set, preferably by means of the method above, but the division of points set may also be carried out by hand. If the division of the point set corresponding to a scene is carried out by the DMRF method, a principally real time implementation of the method can be ensured by means of an appropriate technical background.

Figure 2:
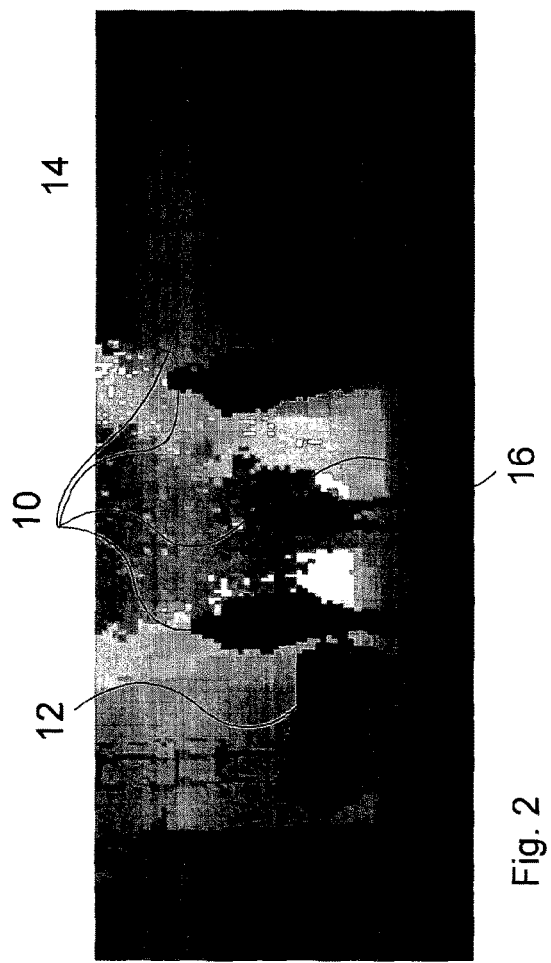
FIG. 2 is a distance image of a scene projected to a cylindrical surface.

According to the DMRF method, the point set corresponding to a scene of uneven density is projected to the surface of a cylinder, by which a depth image of the scene is obtained on the surface of the cylinder as on a regular grid, and this 2D distance image is also used for separating into foreground and background. Such a distance image projected to a cylinder surface is shown in FIG. 2.

The dynamic point set may be modelled also as cumulative set of Gaussian distributions, and there is also a known method for refreshing the parameters (Stauffer, C., Grimson, W. E. L.: Learning patterns of activity using real-time tracking. *IEEE Transactions on Pattern Analysis and Machine Intelligence*, Vol. 22, pp. 747-757 (2000)). By using this method, a very noisy distribution of the point set corresponding to a scene is obtained for modelling of the dynamic distance image. Undesirable effects may be caused by the quantisation error of the discretised angle of vision, the non-linear site corrections of the sensor calibration and the vibration of the background as a result of e.g. the presence of vegetation.

Figure 3:
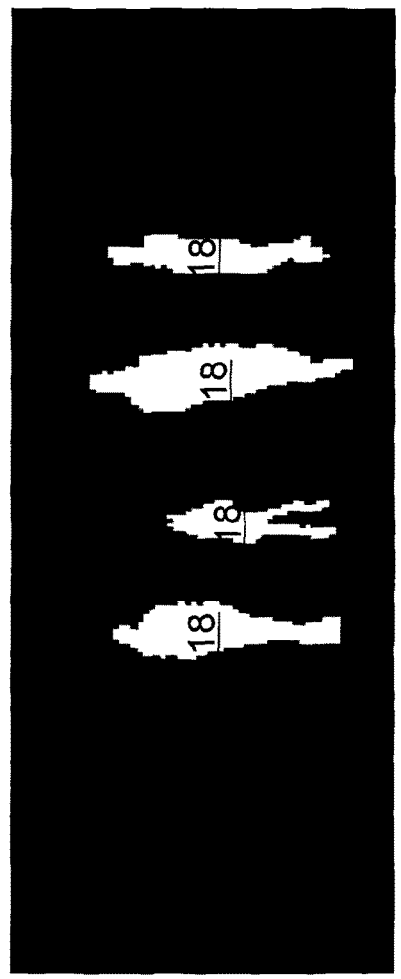
FIG. 3 illustrates an object shape mask associated with the object shapes located in the foreground of the scene shown in FIG. 2.

These undesirable effects may be significantly reduced through the application of the DMRF method, which determines the background point set and the foreground point set according to spatial and time characteristics. According to the method, the segmentation of the 2D distance image is followed by a 3D point classification step in order to make sure that the errors resulting from the 3D-2D imaging to the cylinder, yielding the distance image, are resolved. Thereby, dividing the point set corresponding to a scene into a foreground point set and a background point set can be greatly improved and made more accurate. FIG. 3 illustrates the parts of the foreground point set corresponding to the foreground as shown in FIG. 2, i.e. the object shape mask 18, which allows the separation of all points of the background.

The following discussion will cover the processing of the foreground point set obtained by dividing the point set corresponding to a scene, i.e. the method of recognising object shapes, i.e. determining and, in the case of dynamic object shapes, tracking the object shape subsets according to an embodiment of the invention. In the following discussion, a method will be described for detecting and tracking object shapes moving in point set series recorded by a LIDAR device in real time, to provide a point set at its output in almost real time. Each step of recognising the object shapes, as shown below, is identical for the static and moving object shapes. In the embodiment of the invention to be described below, a short term and long term object shape assignment is used. By means of the so-called short term assignment (STA), the object shape subsets are separated from the foreground point set of the point set corresponding to a scene, and their weighted central point position is assigned to them on subsequent time levels. The so-called long term assignment (LTA) is responsible for bridging the interrupted trajectories; the interruptions may be caused by faulty results of the STA and the object shapes which disappear due to temporary occlusions. The short term and long term assignment is carried out on the basis of the characteristic features of the tracked object shapes, and the characteristic features are stored, if the object shape leaves the field of vision. In the case of newly appearing object shapes, the characteristic features are obtained during an initialisation period. Object shapes may be reactivated by examining the similarity of a newly appearing object shape and the archived or now occluded previously present object shapes. The STA can be carried out in real time, while the identification information of object shapes may be displayed in a given case with a short delay, following the reappearance of the given object shape in the field of vision.

For recognising each of the object shapes, i.e. for the determination of object shape subsets, the input data is based on the separation of the point set corresponding to a scene into a foreground point set and a background point set. As an output of recognising the object shapes, object shape subsets of the foreground point sets are obtained which correspond to the same object shape, along the full length of the time series of the point set corresponding to a scene. The time series can even comprise a single member, and the steps of the method according to the invention may be carried out also for a series consisting of a single member. A method adapted for determining a trajectory corresponding to an object shape and applied in the present embodiment will also be described below.

In an embodiment, the object shape subsets are determined as follows. After dividing the point set corresponding to a scene into a foreground point set and a background point set, by modelling the topographic features of the scene, a topographic model is generated, at least one projected object shape subset corresponding to each of the at least one object shape, respectively, is generated by dividing the projected foreground point set by means of shape filtering and/or dimensional fitting, and the at least one object shape subset is determined on the basis of the at least one projected object shape subset. In the processing of such scenes, where the topographic features can be well approximated by a plane, the topographic model is established on the basis of an approximating plane fitted to the topographic features of the scene. Fitting of the approximating plane may be carried out by way of example through an algorithm based on the paper Fischler, M., Bolles, R.: Random sample consensus: A paradigm for model fitting with applications to image analysis and automated cartography. In: *Comm. of the ACM.* Vol. 24, pp. 381-395 (1981).

In such an embodiment of the method, a regular oblong grid C is fitted onto the topographic features, i.e. principally to the ground plane as an approximating plane. The grid distance can be determined on the basis of the characteristic lateral extension of the object shape intended to be substituted. The LIDAR device as a scanning device is arranged in the central cell marked $c_0$ in the grid C. Then, in accordance with the discussion above, the foreground point set is projected vertically to the grid C, and the number of foreground points N(c) projected to the given cell c is determined for each cell c of the grid C. Next, a cell mask $N_b(\ )$ is generated by thresholding the function $N(\ )$, i.e. those cells are selected, which comprise at least the number of points $\tau_N$. The threshold number $\tau_N$ is determined so as to allow on the basis of the—principally top view—mask $N_b$ the identification of the centre of each object shape, and in addition the intention is to avoid the assigning of the object shapes located close or slightly connected to each other (e.g. belonging to human figures who shake hands with each other) to the same object shape subset. Preferably, a threshold value $\tau_N=10$ can be applied.

In the next step, the contiguous areas $\{b_1, \ldots, b_k\}$, which are object shape subsets projected to the grid C and corresponding to each of the object shapes are selected from the binary image $N_b$. For each subset $b_i$, its so-called 'point volume' is determined on the basis of the formula $v_i = \Sigma_{c \in b_i} N(c)$, and its weighted centre is determined on the basis of the formula $c_i = \Sigma_{c \in b_i} c \cdot N(c)/v_i$. Because the density of the point set provided by the LIDAR device decreases with the square of the distance calculated from the position of the LIDAR device, the subset $b_i$ is considered to be a real object shape candidate, if $v_i \cdot \|c_i - c_0\|^2 > \tau_{vol}$, i.e. it has an appropriate 'point volume'. In the courtyard of 15 m radius examined exemplary, the threshold value $\tau_{vol}=100000$ is applied, measuring the co-ordinates of the points in centimeters. In this way, a dimensional fitting is practically carried out, and therefore in the present embodiment of the method according to the invention it can be ensured that the area corresponding to an object shape in the approximating plane is not smaller than a lower threshold value; preferably an upper threshold value may also be specified. As an output of this part of the procedure, for each time level, the measured location points $\{M_1, \ldots, M_n\}$ of the object shapes are obtained in the two-dimensional ground plane, where $n \leq k$ and $M_i = c_j$ (cf. the formula of determining the weighted centre), if $b_j$ correspond to the $i^{th}$ real object shape candidate.

In another embodiment of the method according to the invention, the topographic model is generated on the basis of a parameterised surface which follows the unevenness of the topographic features and is fitted to the topographic features of the scene. In these embodiments, the position of the object shape in the scene can be determined by obtaining two horizontal co-ordinates from the top view, i.e. from the vertical projection, and on the basis of the parameterised surface fitted to the topographic model, the third co-ordinate characterising the vertically position is obtained. Later on, we shall present another part of the method aimed at determining a trajectory. If the topographic model is determined on the basis of the approximating plane, the trajectory may run in the plane of the approximating plane, i.e. in two dimensions. If, however, the topographic model is generated on the basis of the parameterised surface, the trajectory may also be a spatial curve.

Re-projecting the subsets around the valid measuring points, i.e. the projected object shape subsets, vertically into the foreground of the point set corresponding to a scene, the object shape subsets are obtained, and the object shape subsets corresponding to the measurements are abstracted and stored for the tracking step.

Figure 6:
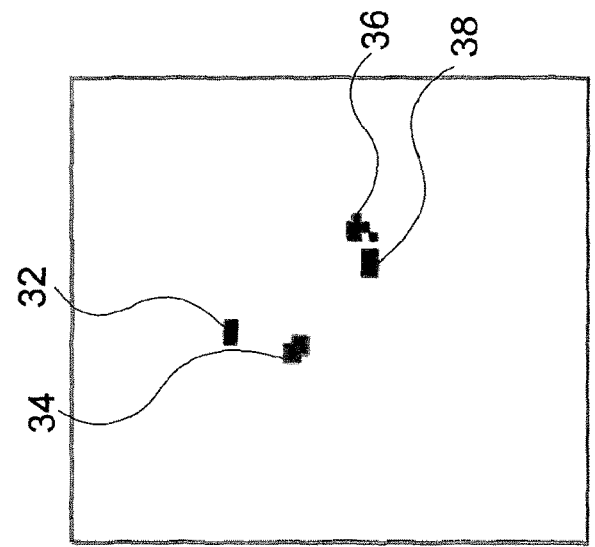
FIG. 6 is a drawing illustrating the location points of the object shape subsets shown in FIG. 4.
Figure 5:
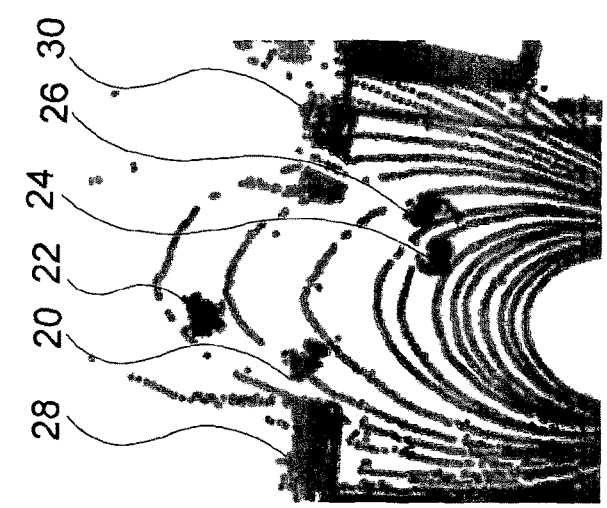
FIG. 5 is a top view of the point set shown in FIG. 4.
Figure 4:
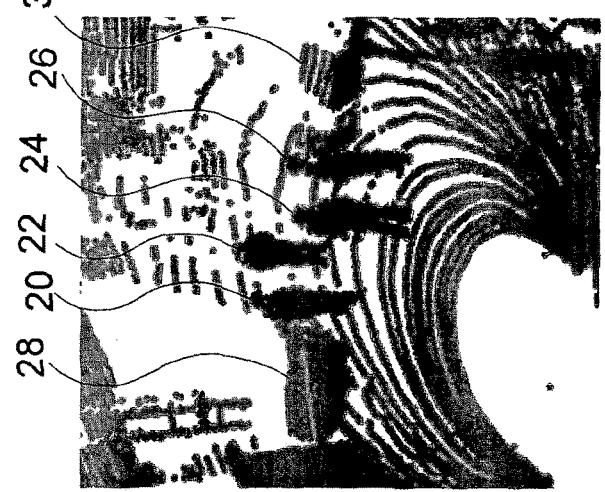
FIG. 4 is a drawing illustrating in side view a point set corresponding to a scene by depicting object shape subsets and subsets of static object obtained with the method according to the invention.
Figure 10B:
FIG. 10B is a photo of the scene shown in FIG. 10A.
Figure 11B:
FIG. 11B is a photo of the scene shown in FIG. 11A.

FIGS. 4 to 6 illustrate the discussion above. FIG. 4 shows a point set corresponding to a scene generated by means of a rotary multi-beam laser scanner, i.e. a LIDAR device, in relation to the shapes that can be seen in the scene, as a side view. FIG. 4 shows object shape subsets 20, 22, 24, 26 and static object subsets 28, 30. In the figure, the white spot shown to the left and down of the object shapes, i.e. of the feet of human figures, indicates the place of the scanning device; the curves corresponding to the same centre and located at the feet of the figures may also imply the place of the scanning device. In the illustrated example, containers correspond to the static object subsets 28, 30 as shown in FIGS. 10B and 11B showing the same scene. The character of the static object subsets 28, 30 shows excellently that the laser scanning device is only able to sample the scanning device side of the objects and object shapes, respectively, and the rest of the objects or object shapes are occluded from the laser scanning device, and they appear as white spots in the point set corresponding to a scene. This is also shown in the top view of FIG. 5, where the white spot in the bottom part of the figure is associated with the place of the scanning device. The laser beams come from the laser scanning device, and therefore by way of example the static object subset 30 is incomplete, the points are missing from it in two parallel strips as shown in the figure, due to the occlusion of the feet of the human figure corresponding to the object shape subset 26. Similarly, due to occlusions, there are interruptions also in the curves having an identical centre.

FIG. 4 is a side view of the point set corresponding to the given scene, but the point set, as a result of its structure, can be viewed from any point, and hence by way of example in the top view of FIG. 5, the distances between the various object shapes can be better perceived than in FIG. 4. The top view of FIG. 5 practically illustrates the projected object shape subsets corresponding to the object shape subsets 20, 22, 24, 26, because the projected object shape subset is obtained by projecting all points of the given object shape subset to the approximating plane fitted to the ground plane.

In FIGS. 4 and 5, the points corresponding to the object shape subsets 20, 22, 24, 26 are coloured, and therefore the object shape subsets 20, 22, 24, 26 can be separated easier, and it can be followed which object shape subset is corresponding to the same object shape in each view. Therefore, in an embodiment of the method, after the separation of the at least one object shape subset, the points of the at least one object shape subset are displayed as provided with colours, which are preferably different for each subset in the case of segregating several object shape subsets. Displaying the point set comprising the separated object shape subsets is not necessarily required, because the further steps of the method according to the invention may even be performed without this. The colouring of each object shape subset has special importance even if a time series of the point set corresponding to a scene is available, because in this case the colouring of the object shape subsets makes each object shape more traceable. FIG. 6 illustrates projected object shape subsets 32, 34, 36, 38 corresponding to the object shape subsets 20, 22, 24, 26 obtained by projecting them to the approximating plane and looking at them slightly further from the approximating plane, whence the projected object shape subsets 32, 34, 36, 38 look more sketchy.

An object shape subset may be unambiguously assigned to each object shape as described above, but because of the occluding effect of the object shapes and objects, respectively, the object shapes may be partly occluded, and therefore the object shape subset of these object shapes may be incomplete, or they may be divided into several parts on each time level. The separation of object shape subsets can be performed in most cases without any problems also in such cases, as described below.

In the following, the method to track the object shapes, i.e. to determine their trajectories will be disclosed. In the course of tracking the object shapes, a combination of the already mentioned short-term assignment (STA) and long-term assignment (LTA) is applied. STA is performed preferably by means of an STA module and LTA preferably by an LTA module. It is attempted with the STA module to fit each actually detected object shape candidate to the considered trajectories on the basis of the positions of the weighted centres of the projected object shapes. The STA module is also adapted for continuing a given trajectory even if the scanning device does not sense the given object shape in some time levels, which are characteristically few, due to the occlusion of the object shape. In such cases, the temporary interruptions of the trajectories are bridged by the estimated location rates. On the other hand, the LTA module is responsible for determining characteristic features regarding each object shape so as to re-identify such object shapes which had been lost by the STA module because they were occluded in several subsequent time levels or they left the field of vision. Due to this, the lost object shapes are added to an object archiving list, which is checked periodically by the LTA module. Not yet registered object shapes newly arriving at the scene are also recognised by the LTA module.

On the basis of the weighted centres—in the case of human figures, principally foot positions—corresponding to the object shapes and determined according to the discussion above, the task of the STA module can be defined as a so-called multitarget tracking problem, to be tackled by a classical linear Kalman-filter approach (Kalman, R. E.: A new Approach to Linear Filtering and Prediction Problems, *Transaction of the ASME—Journal of Basic Engineering*, pp. 35-45 (1960)). On each time level, n number of detected object shape candidates may be assigned to the considered object shapes of m number. It is assumed that for each $j=1, \ldots, m$ a further estimated position $O_j$ has been assigned for the $j^{th}$ considered trajectory, on the basis of the earlier movement of the object shape. As already introduced above, $M_i$ ($i=1, \ldots, n$) marks the positions of object shapes detected on an actual time level, i.e. the measuring points which are preferably in the weighted centre of the object shape. On the basis of these two data, i.e. in accordance with the earlier movement of an object shape, the estimate given for the new position and according to the actually measured position, a distance matrix D is written on the basis of the Euclidean distance values in the two dimensional space: $D_{ij}=\|M_i-O_j\|$.

In an embodiment of the method according to the invention, on the basis of the time series of the location points, at least one trajectory is determined for at least one object shape by the so-called Magyar method (Kuhn, H. W.: The Hungarian method for the assignment problem, *Naval Research Logistic Quarterly*, Vol. 2, pp. 83-97 (1955)), i.e. the considered trajectories and the actual measuring points are assigned to each other by the Magyar method, for which, however, a square distance matrix $D=[D_{ij}]_{p \times p}$ is required, where p=max(m,n). Therefore, if m>n, then temporarily an m−n (n subtracted from m) number of fictitious measuring points are generated, located at the largest possible distance from all the trajectories considered in the matrix. Similarly, if n>m, fictitious trajectory m−n is generated for supplementing the matrix D.

The output of the fitting carried out by the Magyar method is an unambiguous (injective) mapping i→A(i) between the measuring points and the trajectories, where the index i and A(i), respectively, may be associated with a real or fictitious measurement or trajectory. Let $\tau_{dist}$ be a distance threshold value. The mapping is interpreted by means of the following programme-part:

```
if (i ≤ n, A(i) ≤ m):
    if(D_{i, A(i)} < τ_{dist})
        the measuring point M_i 'fits' to the trajectory O_{A(i)}
    else
        both the i^{th} measuring point and the A(i)^{th} trajectory is marked
            as 'non-fitting'
    endif
elseif (m ≥ i > n and A(i) ≤ m)
    the A(i)^{th} trajectory is marked as 'non-fitting'
else
    the i^{th} measuring point is marked as 'non-fitting'
endif
```

If the measuring point $M_i$ 'fits' to the estimated point $O_j$ of a given trajectory, it is considered that $M_i$ specifies a new position of the object shape corresponding to the $j^{th}$ trajectory. Since the measuring position $M_i$ is given by the weighted centre of the full projected object shape subset, a strong measuring noise may be frequently experienced. Due to this, a linear Kalman-filter is assigned to each trajectory and it is updated with the assigned measuring values on each time level. The trajectories tagged 'non-fitting' are not closed immediately, but they are first marked as inactive, in which status they may remain up to the time level $T_{SIL}$. The inactive trajectories also contribute to the steps above, but since they do not have actual measured values, the Kalman-filter of the given trajectories will be updated with the last estimated value. In both cases, the next point of the trajectory will be the filter corrected value. As the last step of refreshing the trajectory, an estimate is given for the next point of the trajectory with the Kalman-filter (the next $O_j$ series is specified), which can be used for the fitting on the next time level. The measuring points tagged 'non-fitting' are the starting points of new trajectories potentially, and therefore a new object tracking will be initiated therefrom, to be examined in the next iterations. Further steps in relation to the trajectories tagged 'non-fitting' will be described below.

In the present embodiment, on the basis of the location points, consequently at least one trajectory is determined by performing the following steps cyclically. A next location point in sequence is assigned for the at least one object shape, the assigned location point is corrected after examination with a Kalman-filter, and finalising the corrected location point, and a proposal is made by means of a Kalman-filter, for the next location point in sequence, for the at least one object shape.

Therefore, the input of the procedural steps described above is the time series of the point set corresponding to the scene, where each point is marked by a foreground or a background tag, i.e. each level of the point set corresponding to a scene time series is divided into a foreground point set and a background point set. As the output of this step, the object shape subsets of the foreground point set are obtained, and the object shape subsets corresponding to the same object shape preferably maintain the very same tag in the complete time series of the point set corresponding to a scene, i.e. in the time series of the point set corresponding to a scene, the object shape subsets corresponding to each object shape can be tracked.

In the above illustrated embodiment of the invention, when the scanning device is arranged in a given place, a time series of a point set corresponding to the scene is generated by the scanning device. In such embodiments, a trajectory is also defined according to the discussion above for each object shape. The trajectory may be of the two or three dimensional type, and it can be used in the reconstruction of the scene. The at least one trajectory corresponding to the at least one object shape, in accordance with the description above, may be preferably obtained by the following steps. In such embodiments, for each element of the time series of the point set corresponding to a scene, the projected object shape subsets corresponding to the object shapes can be obtained, i.e. again a time series of the projected object shape subsets are generated. On the basis of the at least one projected object shape subset, the location points series of at least one object shape on the topographic model is determined, and on the basis of the series of location points, at least one trajectory is defined for each of the at least one object shape. In the embodiments where the trajectory is determined, as the location point of at least one object shape—in the case of human figures principally the locations of the feet of the object shape on the ground plane—preferably the weighted centre of the projected object shape subset corresponding to the given object shape is selected.

The long-term assignment (LTA) is disclosed in the following. In an outdoor scene, point sets detected by a LIDAR device are considered to be relatively rare. Depending on the distance from the LIDAR device, 180 to 500 points are collected for a given object shape, which is relatively limited information for a biometric analysis. Examining numerous characteristics of the static and dynamic point detectors it has been found that, especially in the case of a scene of a type similar to the one examined, preferably two of them can be used for the re-recognition of object shapes.

Figure 7A:
FIG. 7A shows the point set subsets of two object shapes with a colouring proportional to the intensity reflected from the object shapes.
Figure 7B:
FIG. 7B is an intensity histogram associated with the two object shapes of FIG. 7A.

First, the reflection intensity measured by the LIDAR device shows different statistical properties in the case of different object shapes, because in the case of e.g. human figures, their clothing may be made of a number of different materials, and in the case of other object shapes, various casings crop up. In FIG. 7A, an object shape subset corresponding to two selected human figures is visible, and in the figure the points are coloured in accordance with the values of measured intensity. As a function of wave length, intensity histograms measured on 100 time levels associated with these figures are depicted in FIG. 7B; on the basis of the histograms, the colour characterising each object shape may be determined. Although the differences are not so striking in many cases than in this illustrating example, we have found that the Bhattacharyya distance between the normalised intensity histograms $h_1$ and $h_2$ shows efficiently in the case of two object shape samples whether one candidate corresponds to the same person or not.

$$d_{Bhat}(h_1, h_2) = -\log \sum_{k=0}^{255} \sqrt{h_1[k] \cdot h_2[k]}$$

Figure 7C:
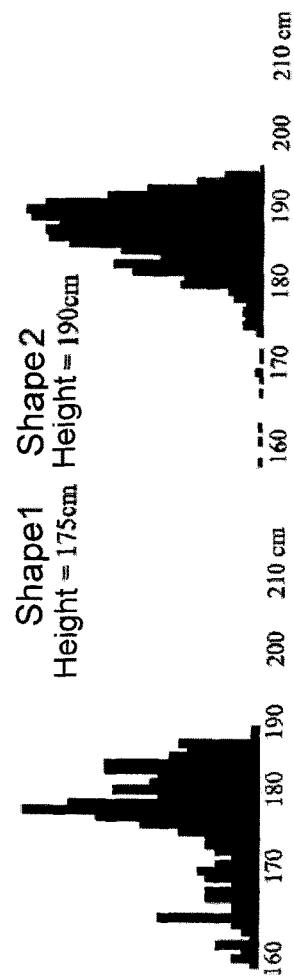
FIG. 7C is the histogram of height values extracted from the two object shapes on various levels.

A second crucial feature is the height of each object shape. On a given time level, the height may be estimated by taking the distance between the highest and lowest points of an object shape subset. This feature has proven to be relatively unreliable due to the relatively low vertical resolution of the LIDAR device, if the height value has been calculated on the basis of one or more point sets. On the other hand, we have found that by determining the peak value of a so-called actual height histogram obtained for the more than 100 time levels, an appropriate height estimate with an error smaller than 4 cm may be derived. Such a histogram is shown in FIG. 7C, specifying the number of measurements corresponds to each height value, and showing the calculated average height. Even when this robust calculation is applied, the estimated height is qualified to be a weak characteristic, but it can significantly support the functioning of the LTA module, if two object shapes of similar level are present simultaneously in the field of vision.

Since both characteristics, i.e. the reflected intensity and the height, are obtained from the time statistics of features, a newly emerging object shape must first enter an initialisation phase, during which the data of the histograms are collected. After a given number ($T_{initL}$) of time levels, it is attempted with the LTA module to match the trajectory corresponding to the given object shape to an archived trajectory or to qualify it as a new trajectory, and the given object shape is then marked as having been identified. Matching by the LTA module is only accepted in case both the reflected intensity and the height show a similarity in the examined time phase, i.e. in the initialisation phase. If in the re-recognition step taken by the LTA module, the matching of the object shapes to all the archived object shapes proves to be unsuccessful, the given object shape is qualified to be new, and the LTA module assigns a new individual identifier to the given object shape.

Figure 8:
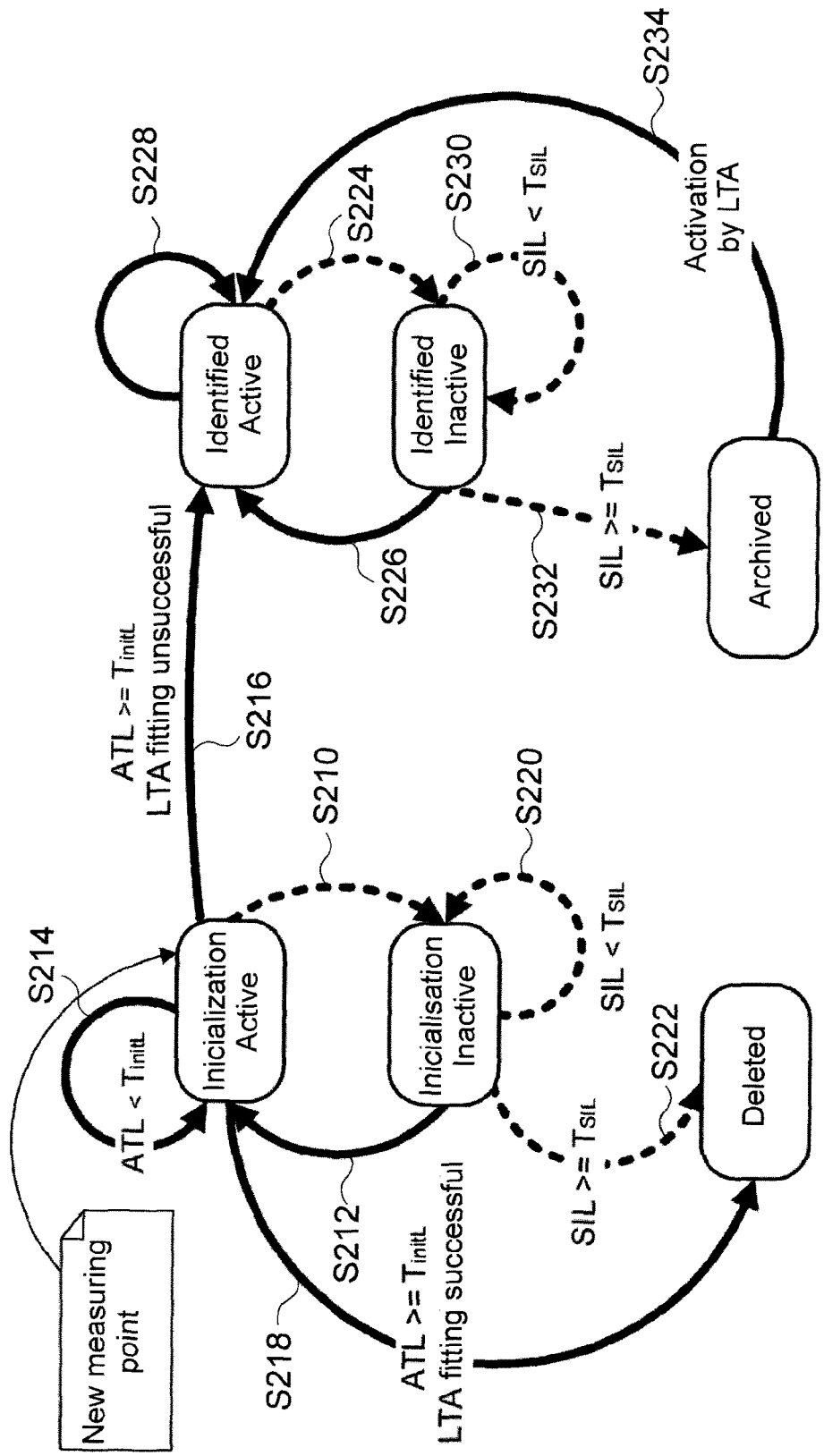
FIG. 8 is a drawing illustrating the STA and LTA method parts.

Based on the STA and LTA modules introduced above, the tracking of object shapes, i.e. the defining of their trajectories is implemented by a so-called 'finite-state machine', as illustrated in FIG. 8. In the figure, the continuous arrows depict such operational steps, which are taken when a new measuring point is matched successfully by an STA module, i.e. when the new measuring point is matched to a registered trajectory, and the dotted arrows demonstrate such operational steps which are taken when the matching of the new measuring point by the STA module is unsuccessful. By means of the acronym ATL (Active Trajectory Length) the total number of such trajectory points is indicated, which has been taken into consideration as valid points in the tracking. By means of the acronym SIL (Short-term Inactivity Length) the number of those time levels is indicated, during which the examined object shape is inactive during the examination with the STA module. $T_{SIL}$ specifies the highest permitted value of the SIL parameter, and $T_{initL}$ provides the lowest ATL value necessary for handling by the LTA module.

The status of an actually tracked object shape specifies whether the object shape is in an active or inactive status according to the STA module and whether it has already been identified or it is still in the initialisation phase. By means of these two binary character parameters, four states can be distinguished, as shown in the upper part of FIG. 8. The transitions between the active and inactive statuses of the initialisation phase and the identified phase are controlled by the STA module depending on whether the actual new measuring points can be matched to the existing trajectories. This is indicated by the dotted and continuous arrows connecting the associated active and inactive conditions: if in the active status the STA module does not detect matching in the case of the next measuring point, then the active status changes to the appropriate inactive status (operational steps S210 and S224), i.e. a break is experienced in the trajectory; in the case of a new successful STA matching, the inactive status changes back to active status (operational steps S212 and S226), i.e. the trajectory continues.

The object shapes can remain in an inactive status up to the number of time levels $T_{SIL}$; as a result of the unsuccessful STA fittings that take place during the time $T_{SIL}$, the object shape remains in an inactive state (operational steps S220 and S230). Such object shapes in the initialisation phase which are proven to be inactive longer than time $T_{SIL}$ during the initialisation phase are excluded from further examinations (operational step S222) and the corresponding trajectories are deleted. These deleted trajectories generally correspond to measuring noise, or they are too short to function as reliable characteristics in subsequent matching operations performed by the LTA module. And, those identified object shapes which are inactive for longer than time $T_{SIL}$ are added to the archiving list (operational step S232): the archived object shapes are not taken into consideration by the STA module, but they can be reactivated by the LTA module.

The marking according to the LTA module can be applied for such object shapes, which have been in an active status in the initialisation phase at least through $T_{initL}$ number of time levels. If the $T_{initL}$ time levels have not been exceeded yet, the successful STA fittings lead back in the operational step S214 to the active status of the initiating phase. If a match is found with an archived object shape, the new and the matching object shape trajectories are combined, interpolating the missing trajectory points. Next, the archived object shapes recognised by the LTA module get into an identified active state in the operational step S234 and the newly emerged object shape is deleted in the operational step S218 to avoid duplication, because the LTA module has found that the trajectory of an archived object shape continues. On the other hand, if matching with the LTA module has not proved to be successful, the newly emerging object shape gets into an identified active state in an operational step S216, maintaining its identifier. According to the discussion above, the trajectory can be identified with a high accuracy and efficiency.

In the modules executing the operations above, some threshold value-type parameters are applied, such as the cell occupation value $\tau_N$, the object shape volume $\tau_{vol}$, the distance threshold $\tau_{dist}$ applied in the STA module or the $T_{SIL}$ and $T_{initL}$ time level boundaries in the case of inactive or pre-identified object shapes. These indicators depend on the one hand on the refreshing rate and/or on the geometric density and density-distance characteristics of the obtained point set, and they can be adjusted based on the hardware specification of the LIDAR device. An even more sensitive parameter is the highest permissible intensity difference applied in the case of matching performed by the LTA module. Our experience shows that matching performed by the LTA module is efficient in the case of separating 6 to 8 object shapes; in such scenes where many more object shapes are present, it may become necessary to involve further biometric characteristics, which may even originate from various sensors.

The trajectory identification described above, i.e. practically the tracking has been evaluated quantitatively according to the following example, examining in parallel the point set time series corresponding to the scene and the video recording made on site. It is noted that the method and system according to the invention do not use the video recordings made on site, and they have only been made in order to verify the tracking and the re-recognition.

In order to quantify the evaluation, we have counted the following events:

number of STA transitions: the total number of inactive/active transitions during the determination of the trajectories, i.e. the number of those events when the STA module is able to continue the trajectory after the object shape corresponding to the scene has been occluded on some time levels (calculated automatically);

number of STA transition errors: the number of faulty trajectory assignments of the STA module (calculated on the basis of the recordings);

number of LTA transitions: the total number of archived and identified transitions during the determination of trajectories, i.e. the number of those events when the LTA module is able to recognise an earlier archived and re-emerging object shape (calculated automatically).

number of LTA transition errors: the number of faulty object shape assignments of the LTA module (calculated on the basis of the recordings).

Figures 9A, 9B:
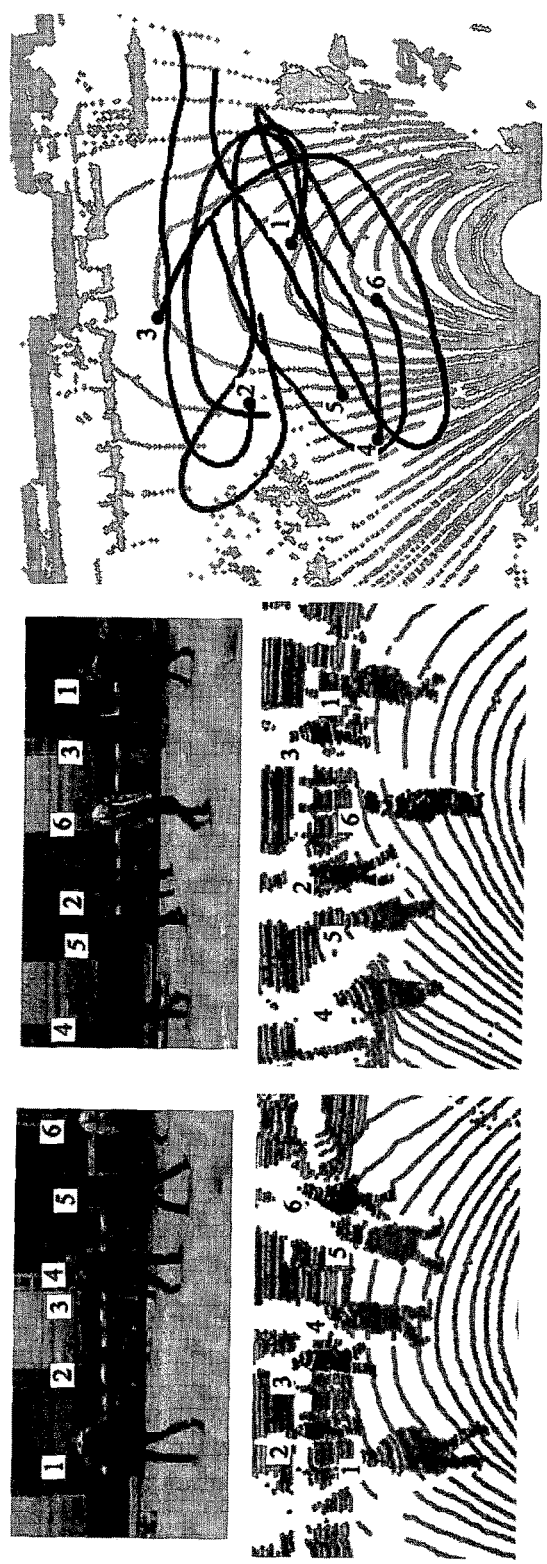
FIG. 9A illustrates the point set corresponding to two time levels and the associated optical recordings.
FIG. 9B is a drawing showing the trajectories between the time levels of FIG. 9A.

FIG. 9A shows two time levels and the associated photo from the Winter2 time series. Between the two selected time levels, the human figures leave the field of vision, and therefore the full re-recognition is to be carried out by the LTA module; it is not possible to handle the occlusions by the STA module. The raw trajectories are considerably noisy in spite of using the Kalman-filter, and therefore the trajectories were subjected to smoothing by an 80% compression in the Fourier space (Zhang, D. and Lu, G.: A comparative study of Fourier descriptors for shape representation and retrieval. In *Asian Conference on Computer Vision* (*ACCV*, pp. 646-651, Springer, (2002)). The smoothed trajectories between the time levels of FIG. 9A are shown in FIG. 9B.

A great advantage of the method according to the invention is its substantially real time character. The last line of Table 1 shows the measured processing velocities, and the measuring unit of the numbers is the time level per second (fps: frame per second).

Figure 10A:
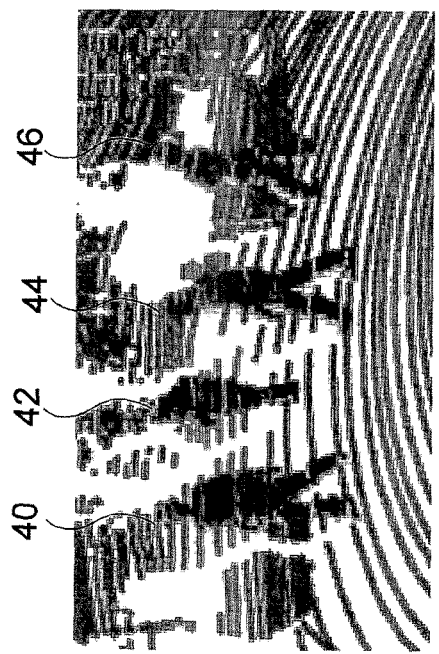
FIG. 10A is the side view of coloured object shape subsets corresponding to a scene in a given moment of time.
Figure 11A:
FIG. 11A is the side view of the coloured object shape subsets corresponding to a scene in another moment of time.

The object shapes following their trajectories are shown in FIGS. 10A and 11A. The figures depict object shape subsets 40, 42, 44, 46 corresponding to the object shapes, and object shape subsets 40', 42', 44', 46', respectively. FIGS. 10B and 11B show the photos i.e. video frames corresponding to the appropriate member of the time series. The figures show a walk in a courtyard. In FIG. 10A, the object shape subsets 40, 42, 44, 46 are displayed in different colours, and therefore it can be tracked that the subsets 40, 42, 44, 46 in FIG. 10A correspond to the subsets 40', 42', 44', 46' of FIG. 10B, respectively, i.e. in the course of walking along the

TABLE 1

| Name of the time series | Number of time levels | Number of human figures | Average number of figures on each level | Number of STA transitions (errors) | Number of LTA transitions (errors) | Processing velocity (fps) |
|---|---|---|---|---|---|---|
| Summer1 | 2566 | 4 | 3.51 | 57 (0) | 1 (0) | 14.95 |
| Summer2 | 960 | 4 | 3.64 | 30 (0) | 0 (—) | 12.89 |
| Summer3 | 1406 | 4 | 3.77 | 44 (0) | 0 (—) | 13.03 |
| Winter1 | 3641 | 4 | 2.91 | 71 (0) | 9 (0) | 12.91 |
| Winter2 | 2433 | 6 | 4.38 | 129 (0) | 12 (0) | 12.65 |
| Spring1 | 2616 | 6 | 4.34 | 127 (0) | 16 (1) | 12.78 |
| Spring2 | 2383 | 8 | 5.51 | 216 (1) | 17 (4) | 12.45 |

The seven different observation situations in the Table represent a difficulty of varying level from the aspect of processing by the STA and LTA modules. First the average number of object shapes visible on the time levels was calculated (Table 1, column 4) in accordance with the time levels of such a point set which comprises at least two object shapes, in the example a human figure. If the human figures are located more densely, this leads to more occlusions, i.e. the number of STA transitions increases, which represents a challenge for the STA module. On the other hand, the total number (4 to 8) of the human figures and the number of LTA transitions make an impact also on the functioning of the LTA module. As shown in the Table, the time series analysed in the first three lines serve for the verification of the STA module. In the rest of the lines (Winter1 to Spring1), by increasing the number of human figures to 6, re-recognition becomes especially crucial: the LTA module functions faultlessly in principle (97% yield). And finally, in the course of examining the scene comprising 8 human figures, because the scene does not only comprise several human figures, but the number of occlusions is also significantly higher, four LTA transition errors occur from the 17 re-recognitions, which represents a yield of 76.4%.

trajectory, the object shape subsets corresponding to each object shape retain their colours.

In the following discussion, the reconstruction of the scene background is disclosed. As already described above, by means of the method according to the invention, the point set corresponding to a scene is divided into a foreground point set and a background point set, for each member of the time series of the point set corresponding to the scene. By means of the division, a background point set is obtained, which comprises the subsets corresponding to the ground, walls, trees and other background objects.

Assuming that the ground plane is appropriately flat and horizontal, according to the discussion above an approximating plane may be fitted to it by the robust RANSAC algorithm already mentioned above (Fischler, M., Bolles, R.: Random sample consensus: A paradigm for model fitting with applications to image analysis and automated cartography. In: *Comm. of the ACM*. Vol. 24, pp. 381-395 (1981)). This algorithm disregards all the objects other than the ground plane. According to the RANSAC algorithm, the points close to this plane are also classified as the approximating plane. The model of the ground may be generated in accordance with the discussion above, also on the basis of the parameterised surface.

In outdoor locations, such elements and objects may also appear which are irrelevant from the aspect of reconstructing the scene, for example weeds and other plants in certain places of the ground, and they are not qualified as important landmarks. The reconstruction of this vegetation is not desirable. In order to detect and remove such vegetation, according to an embodiment of the invention, such operational steps are applied in which on a statistical basis those points of the point set corresponding to a scene which are segregated due to their distance from the ground and/or their unexpected locations (e.g. they appear in a place where they are not supposed to be) and/or because of their low intensity, are classified as vegetation, and the subset corresponding to the vegetation is removed from the point set corresponding to a scene. On the basis of the rate of reflected intensity, the vegetation can be distinguished, because it reflects the laser beam with a lower intensity.

In an embodiment of the method according to the invention, a background three-dimensional model is generated as described below by substituting at least one static object subset of the background point set by the three-dimensional model of the static object. During reconstruction, such static background objects of the background like, for example, trees, containers or parking cars could be substituted by available spatial models. Such spatial models can be obtained e.g. from the Google 3D warehouse (http://sketch-up.google.com/3dwarehouse/). The recognition of these static objects and their separation from the background point set may be performed manually or automatically, e.g. a method based on learning in accordance with the paper Lai, K., Fox, D.: Object recognition in 3D point clouds using web data and domain adaptation. *International Journal of Robotic Research*, Vol. 29, pp. 1019-1037 (2010) may be applied.

The points of the background point set remaining after the removal of the points corresponding to the vegetation and the static background objects are projected vertically to the approximating plane, where the projections of the walls provide straight lines preferably obtained by Hough transformation from the point set corresponding to a scene (Duda, R., Hart, P.: Use of the hough transformation to detect lines and curves in pictures. In: *Comm. of the ACM*, Vol. 15, pp. 11-15 (1972)). By applying the Ball-Pivoting algorithm (Bernardini, F., Mittleman, J., Rushmeier, H., Silva, C., Taubin G.: The Ball-Pivoting algorithm for surface reconstruction. *IEEE Transactions on Visualization and Computer Graphics*, Vol. 5, pp. 349-359 (1999)) for the points, the projection of which falls on a straight line, a polygon mesh is specified for the given wall detail.

Figure 12:
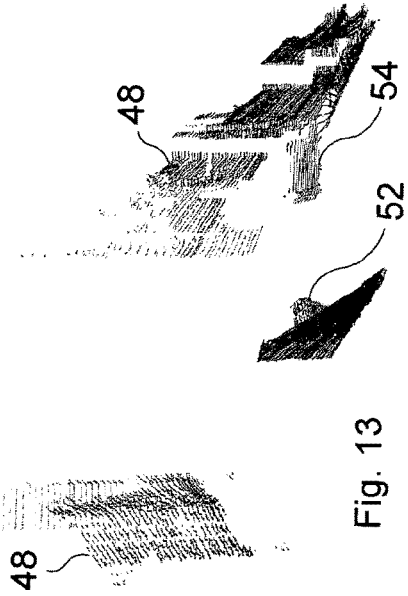
FIG. 12 is the perspective view of a point set corresponding to a scene.

The reconstruction of the background is illustrated by FIGS. 12 to 15; the texturing of the background can be carried out on the basis of photos taken on site. FIG. 12 shows a point set 47 corresponding to the scene already described above, like from a 'bird's eye view'; the oval white spot visible in the foreground of the figure corresponds to the scanning device. FIG. 12 shows background subsets 48 forming part of the background point set and corresponding to the walls, as well as static object subsets 52, 54 corresponding to the containers. FIG. 12 shows in the foreground the object shape subsets corresponding to people are discernible, and also a subset corresponding to a tree in a blurred manner in the centre of the image; but they have not been marked due to the blurring.

Figure 13:
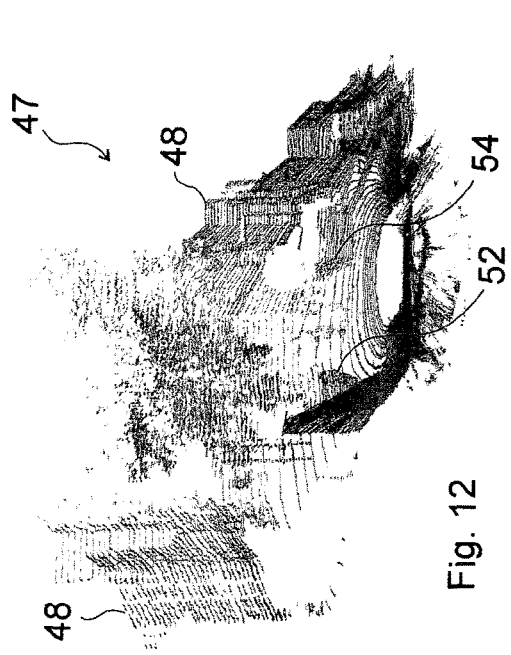
FIG. 13 is a drawing illustrating the background point set shown in FIG. 12.

FIG. 13 shows the subset of the point set 47 of FIG. 11 and obtained by omitting the subsets corresponding to the foreground and the tree, respectively, and this subset comprises the subsets 48 corresponding to the walls and the subsets 52, 54 corresponding to the containers.

Figure 14:
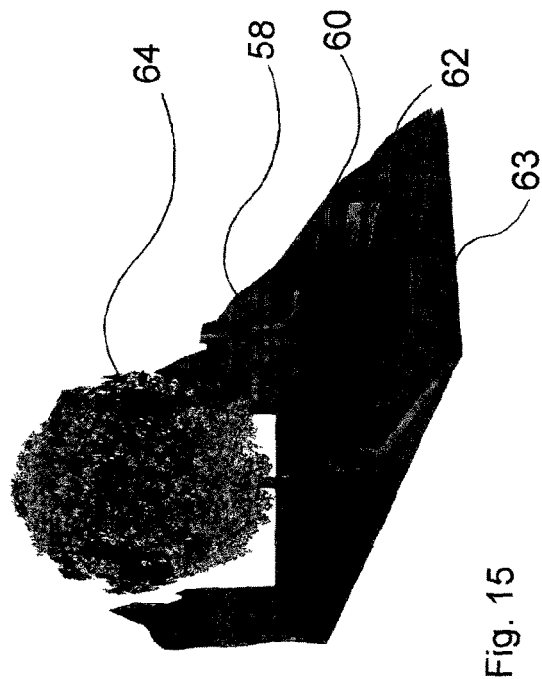
FIG. 14 is the three-dimensional model of the background corresponding to the background point sets of FIG. 13.
Figure 15:
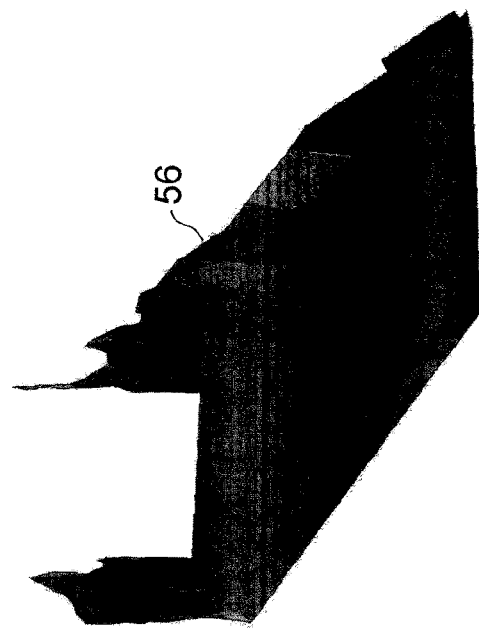
FIG. 15 is a textured three-dimensional model of the background and of the static objects of FIG. 12.

The containers are static objects of the background, and therefore the subsets 52, 54 corresponding to them are substituted by the three-dimensional models available according to the discussion above, as shown by FIG. 15. FIG. 14 illustrates the first step of reconstructing the subsets 48 corresponding to the walls, where a background three-dimensional model 56 is assigned to the background subset 48. This assignment may be carried out in a way that the background associated subsets 48 of the point set corresponding to a scene are fitted with a polygon mesh. The three-dimensional model of the ground may be obtained by polygon mesh fitting.

FIG. 15 shows the textured background obtained by the full reconstruction of the background. The illustrated model of the background comprises a textured three-dimensional model 58 of the walls, textured three-dimensional models 60, 62 of the containers, a textured three-dimensional model 63 of the ground and a textured three-dimensional model 64 of the tree. By way of example, the texture of the walls may be prepared on the basis of the photos taken on site.

The small objects in the foreground of the scene like, for example, the object shapes, may not be reconstructed with an appropriate resolution from the distance data of the scanning device (e.g. LIDAR), because the distance data are rare and the scanning devices are only able to provide characteristically two and a half dimension information. Therefore, as already mentioned above, in the method according to the invention, the subsets corresponding to the object shapes are substituted by such three-dimensional models, which are made on the basis of the optical recordings of substituting object shapes that may be assigned to the object shapes. Such detailed and preferably textured, static or dynamic three-dimensional models may be prepared e.g. on the basis of optical recordings made in a so-called optical studio. The hardware and software components of such a studio are described in the papers Blajovici, C., Chetverikov, D., Jankó, Z.: 4D studio for future internet: Improving foreground-background segmentation. In: *IEEE International Conference on Cognitive Infocommunications (CogInfoCom)*, pp. 559-564. (2012) and Hapák, J., Jankó, Z., Chetverikov, D.: Real-time 4D reconstruction of human motion. In: *Proc. 7th International Conference on Articulated Motion and Deformable Objects (AMDO 2012). Springer LNCS*, Vol. 7378, pp. 250-259 (2012).

Figure 16:
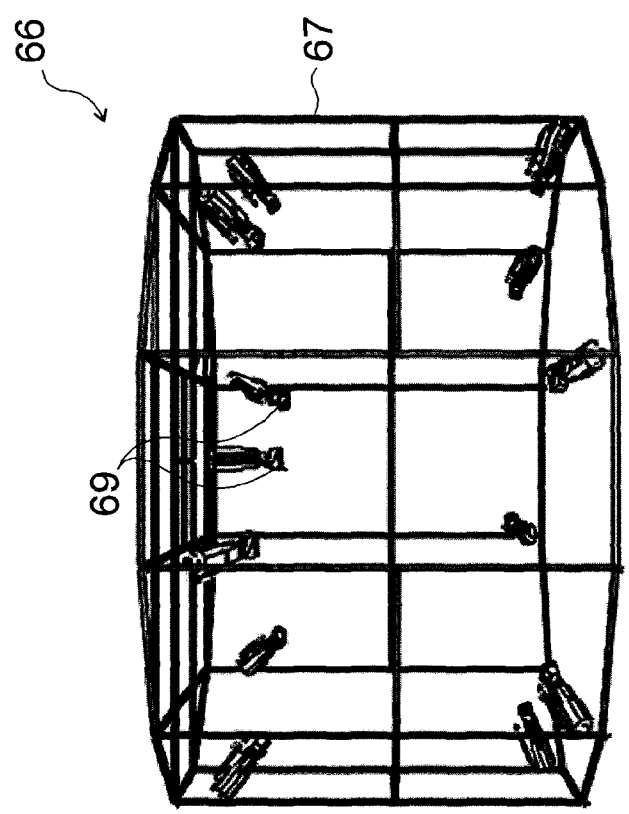
FIG. 16 is a spatial drawing of an optical studio applied in certain embodiments of the invention.

In the following, a brief summary will be given of the reconstruction process applied in optical studios. FIG. 16 depicts the structure of an optical studio 66. The optical studio 66 comprises an inner space adapted for accommodating the at least one substituting object shape, and the said inner space is surrounded by frame 67 in the embodiment depicted by FIG. 16. Furthermore, the optical studio 66 comprises optical recording devices adapted for making optical recordings that is the video cameras 69 in the present embodiment, arranged circularly in at least one row around the inner space and arranged on the upper side of the inner space. The optical studio 66 furthermore comprises a background member surrounding the inner space at least partly, said background member is by way of example a preferably green curtain or drapery arranged on a frame 67. The curtains or draperies provide a homogeneous background for and support the segmentation of the recordings. The optical studio 66 furthermore comprises a processing unit adapted for the processing of optical recordings and for generating the three-dimensional model of the substituting object shape.

In the optical studio of FIG. 16, twelve calibrated and synchronised video cameras 69 are arranged around the inner space of the optical studio and furthermore an additional video camera 69 is arranged in the centre of the top part of the frame 67. In the optical studio, artificial lighting can be provided by high power light sources. From the optical recordings, the calculations necessary for generating the three-dimensional model can be made with e.g. seven desktop computers, which can be responsible also for the control and illumination of the cameras. During the reconstruction, the subsequent frames of the thirteen different video flows recorded simultaneously can be e.g. processed independently of each other. On the basis of a set consisting of thirteen frames in association with one moment of time in the video flow, the computer system of the optical studio makes a preferably textured, three-dimensional model which corresponds to one phase of the movement of the examined object shape or represents a static object shape. The major steps of the spatial reconstruction process which can be automated totally are descripted below; on the basis of the optical recordings, the three-dimensional models of the substituting object shapes that can be assigned to the object shapes may be generated on the basis of the following operational steps:

- the colour images are obtained from the raw data of the optical recording devices;
- every single colour image is divided into foreground and background, and by subjecting the foreground to post-processing, the shadows are removed (Blajovici, C., Chetverikov, D., Jankó, Z.: 4D studio for future internet: Improving foreground-background segmentation. In: *IEEE International Conference on Cognitive Infocommunications (CogInfoCom)*, pp. 559-564. (2012));
- a volumetric model is generated by means of the Visual Hull algorithm (Laurentini, A.: The visual hull concept for silhouette-based image understanding. *IEEE Transactions on Pattern Analysis and Machine Intelligence*, Vol. 16, pp. 150-162 (1994));
- a triangular lattice is assigned to the volumetric model by means of the Marching Cubes algorithm (Lorensen, W., Cline, H.: Marching cubes: A high resolution 3D surface construction algorithm. In: *Proc. ACM SIGGRAPH*, Vol. 21, pp. 163-169 (1987)); and
- the triangular lattice is textured by means of the so-called triangular visibility method (Jankó, Z., Pons, J.-P.: Spatio-temporal image-based texture atlases for dynamic 3D models, in: Proc. ICCV Workshop 3DIM'09, pp. 1646-1653 (2009)).

Figure 17:
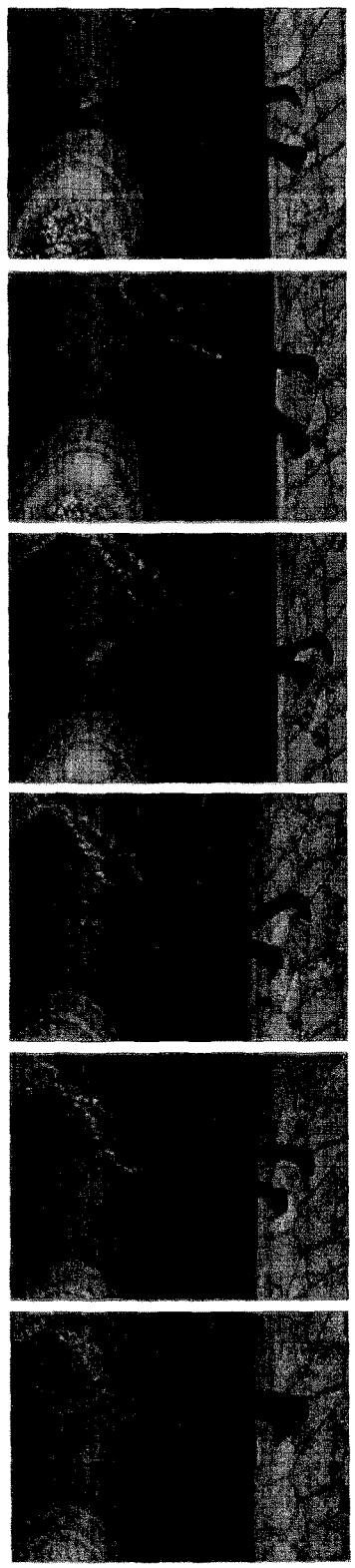
FIG. 17 is an illustration of the movement of a textured object shape.

FIG. 17 depicts the numerous phases of the steps of a human figure, i.e. an object shape. The model shown in the figure is generated by a method according to the invention in a way that the three-dimensional model of the substituting object shape is textured. In FIG. 17, the textured three-dimensional model is placed in front of a reconstructed background.

The last step of the method according to the invention is the integration of the point set corresponding to the scene and the three-dimensional models obtained on the basis of the optical recordings, i.e. generating a combined three-dimensional model by means of the three-dimensional model of the background and the three-dimensional model of at least one substituting object shape. The combined three-dimensional model obtained by the method of the invention is preferably displayed.

In an embodiment of the invention, on the basis of the optical recordings, a dynamic three-dimensional model of the at least one substituting object shape is generated, and the combined three-dimensional model is generated on the basis of the background three-dimensional model and the dynamic three-dimensional model multiplied to a length corresponding to the movement along a trajectory corresponding to the object shape of at least one substituting object shape substituting each of the series of object shape subsets corresponding to at least one object shape, respectively. Therefore in this embodiment, the moving dynamic three-dimensional models are placed into the reconstructed background in a way that the dynamic three-dimensional model tracks the trajectory obtained on the basis of the point set corresponding to the scene. It can be exemplary assumed that the object shape proceeds along the trajectory in one direction. The orientation of the object shape placed on the trajectory in the course of moving along the trajectory is determined subject to the shape of the trajectory, i.e. in each moment of time the direction of the tangent of the trajectory defines the orientation of the three-dimensional model substituting the object shape.

The combination of various formats of data coming from different sources is performed by software developed for this purpose, by which the data are brought to a common format. The combined three-dimensional models are preferably handled in the general application OBJ format (Wavefront Technologies: OBJ file format. *Wikipedia definition*: "Wavefront.obj file" (2013 download)). The OBJ format is supported by most three-dimensional modelling programmes, and this format enables the specification of geometry and texture.

Displaying is preferably carried out by a programme based on a VTK Visualisation Kit (Kitware: VTK Visualization Toolkit. http://www.vtk.org (2013)). The most important requirement imposed on displaying is that it should support the combination of static and dynamic models, allowing their multiplication, while using the calculation capacity optimally. The combined three-dimensional model obtained by the method according to the invention may be displayed in a way that it can be seen, rotated and edited from any arbitrary point of view. In the display environment based on the VTK Visualisation Kit, user interactions with the model, like for example, shifting and scaling are permitted.

The dynamic three-dimensional models may be multiplied not only in space, but also in time. The optical studio applied in some embodiments of the method according to the invention is characteristically small. In the applied optical studio, typically e.g. two steps of a walk can be recorded and reconstructed. This short detail can be multiplied and extended in time by known approaches in a way that the splits are not seen, and therefore a walking person can be displayed. To support this, the computer system of the optical studio shifts the phases of walking in space and time until an appropriate matching occurs at the splits. Other object shapes, like for example those corresponding to vehicles may be reconstructed also on the basis of optical recordings coming from a different source.

Figure 19:
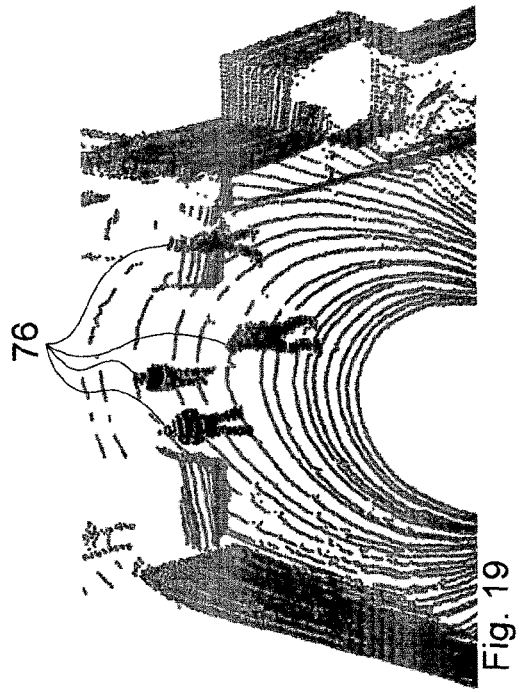
FIG. 19 is a perspective view of a coloured point set of a scene.
Figure 18:
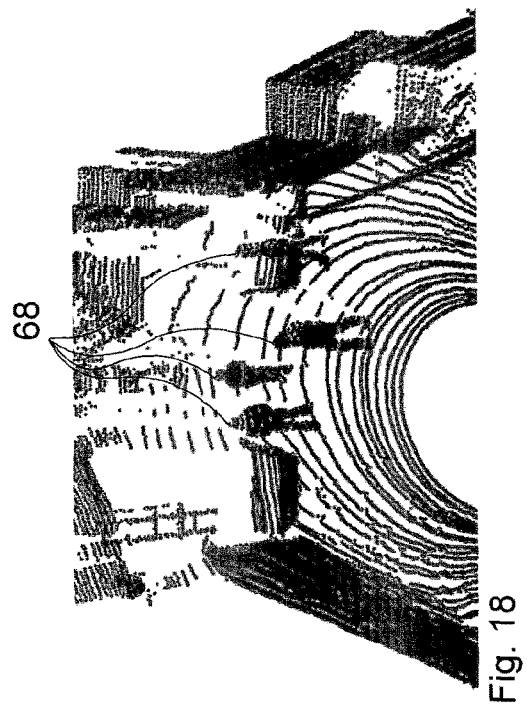
FIG. 18 is a perspective view of a point set corresponding to a scene.

FIGS. 18 and 19 depict a front view of the point set corresponding to a scene presented above. In FIG. 18, all points, and hence also object shape subsets 68 corresponding to object shapes are displayed in the same colour and colour shade. On the contrary, FIG. 19 shows such object shape subsets 76, which are obtained by applying various colours to each object shape subset 68.

Figure 20:
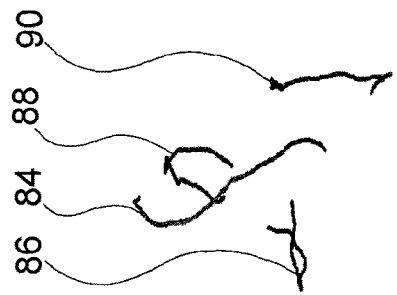
FIG. 20 is the trajectory corresponding to the subsets of the object shape shown in FIGS. 18 and 19.

FIG. 20 shows object shape trajectories 84, 86, 88 and 90 visible in the scenes above, and the trajectories 84, 86, 88 and 90 can be obtained by way of example through the procedural steps described above.

Figure 21:
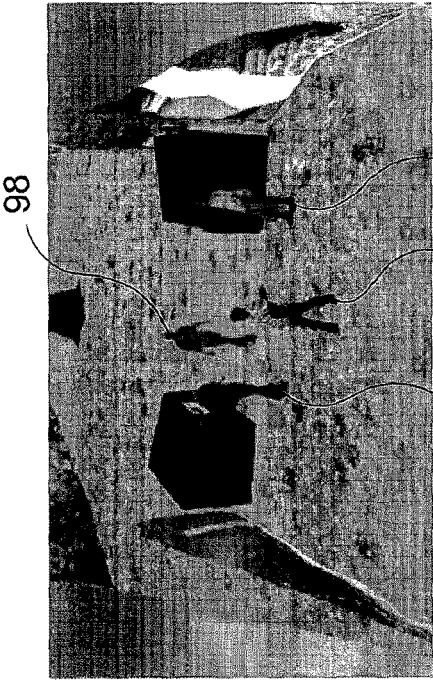
FIG. 21 is a textured scene obtained from the point set of FIGS. 18 and 19.

FIG. 21 shows displaying of a combined three-dimensional model corresponding to the point set shown in FIGS. 18 and 19. In FIG. 21, three-dimensional models 92, 94, 96, 98 of the substituting object shapes and the three-dimensional model of the scene background are textured. The three-dimensional models, so-called avatars, corresponding to the substituting object shapes and shown in FIG. 21 move along the trajectory which is obtained as detailed above from the point set provided by the scanning device. The avatar follows the assigned three-dimensional route, i.e. the trajectory, and the turning of the dynamic three-dimensional model into the appropriate direction is carried out according to the shape of the trajectory.

Another embodiment other than that described above is shown below by means of FIGS. 22 to 28. The embodiment shown below differs from the embodiment described above in the implementation of the steps S120 and S130 of the method according to the invention. Therefore, the differences of the present embodiment appear in the way the point set corresponding to the scene generated by the scanning device is divided into a foreground point set and a background point set and as the at least one object shape subset is separated from the foreground point set. The embodiment of the invention described below is covered in association with such a scene, where the object shapes in the foreground may be human figures and also vehicles. These foreground object shapes may be stationary and also mobile similarly to the discussion above.

The papers by an inventor of this invention (Józsa, O.: Analysis of 3D Dynamic Urban Scenes Based on LIDAR Point Cloud Sequences, *An essay submitted to the Scientific Conference of Student Societies, Budapest University of Technology and Economics,* 2012; and Józsa, O., Benedek, Cs.: Analysis of 3D Dynamic Urban Scenes Based on LIDAR Point Cloud Sequences, in: KÉPAF 2013; 9th National Conference of the Association of Image Processors and Pattern Recognition, proceedings of the conference, pp. 629-644 (2013)) describe the dividing of point sets detected by a LIDAR as a scanning device into a foreground point set and a background point set. In the present embodiment, when a point set corresponding to a scene is divided into foreground point set and background point set, several categories are distinguished. Out of the categories, the background point set is associated according to the present embodiment with the ground category, which comprises e.g. the road, and the tall objects category, e.g. walls and lamp posts. In addition, the category of short objects is distinguished, this comprises those object shapes the substitution of which by a three dimensional model generated on the basis of optical recordings may be desirable in further steps of the method. In addition, when categorising the point set corresponding to a scene, rare regions comprising a few points emerge, and they do not comprise such an object which could be relevant from the aspect of reconstruction.

The papers above describe the separation of these categories, i.e. the division of the point set corresponding to a scene into a foreground point set and a background point set. The papers describe the method of separating the categories, but they do not cover the separation of the object shape subsets in the category of short objects; this is only identified as a future aim by one of the documents. The method of separation of the object shape subsets on the basis of the present embodiment will be described below after presenting the method of separating the categories.

Similarly to one of the embodiments described above, again on the basis of the present embodiment, an approximating plane is fitted to the ground plane, and then the approximating plane is divided into cells, the lateral dimension of which is preferably 50 to 80 cm. The application of smaller cells is not advisable even if the resolution increases, because smaller cells would not comprise a number of points sufficient for obtaining statistical information. On the other hand, the application of larger cells could lead to a larger number of incorrectly categorised points, and in a larger cell more than one object shape may crop up.

The point set corresponding to a scene is projected to the cells. First the rare regions are separated. These regions only comprise some or no points. From these points, only very limited and with a high probability misleading information would be obtained about the scene, and therefore these regions are disregarded in generating the combined three-dimensional model. Preferably, a cell is counted in the category of rare regions, if it comprises 4 to 8 or less projected points characteristically. The exact value of this threshold may depend in the case of a given scene on the rotation velocity of the scanning device; a lower velocity is associated with a higher threshold value.

A cell is to be listed in the category of tall objects, if it comprises projected points corresponding to a tall object of the scene, e.g. a street view. Tall objects could be e.g. the walls of buildings, lamp posts or tree stems. These objects can be considered to be static from the aspect of reconstructing the scene. A cell could be e.g. listed in the category of tall objects, if out of the points falling into the cell, prior to the projection, the point located the highest is at least 140 cm higher than the scanning device or the difference between the heights of the highest and lowest points is more than 310 cm. The present embodiment is characteristically used in the modelling of street views, and the scanning device is located on the top of a car, i.e. the sensor of the scanning device is at a height of approx. 2 m. Therefore, the 140 cm limit applied in the segregation of tall objects is to be compared with this height.

After separation of the cells corresponding to the category of tall objects, the cells falling into the ground category are determined. These cells comprise such parts of the surface above which there is no object shape, but the cell comprises a sufficient number of points to avoid listing in the category of rare regions. Those cells may be listed in this category, which have points meeting the following requirements: the difference between the heights of the highest and lowest points is not more than 25 cm and the highest point is preferably located at least 50 cm and even more preferably at least 100 cm lower than the sensor of the scanning device. Of course, if the scanning device is located on or closer to the ground plane, different threshold values are to be specified.

Figure 22:
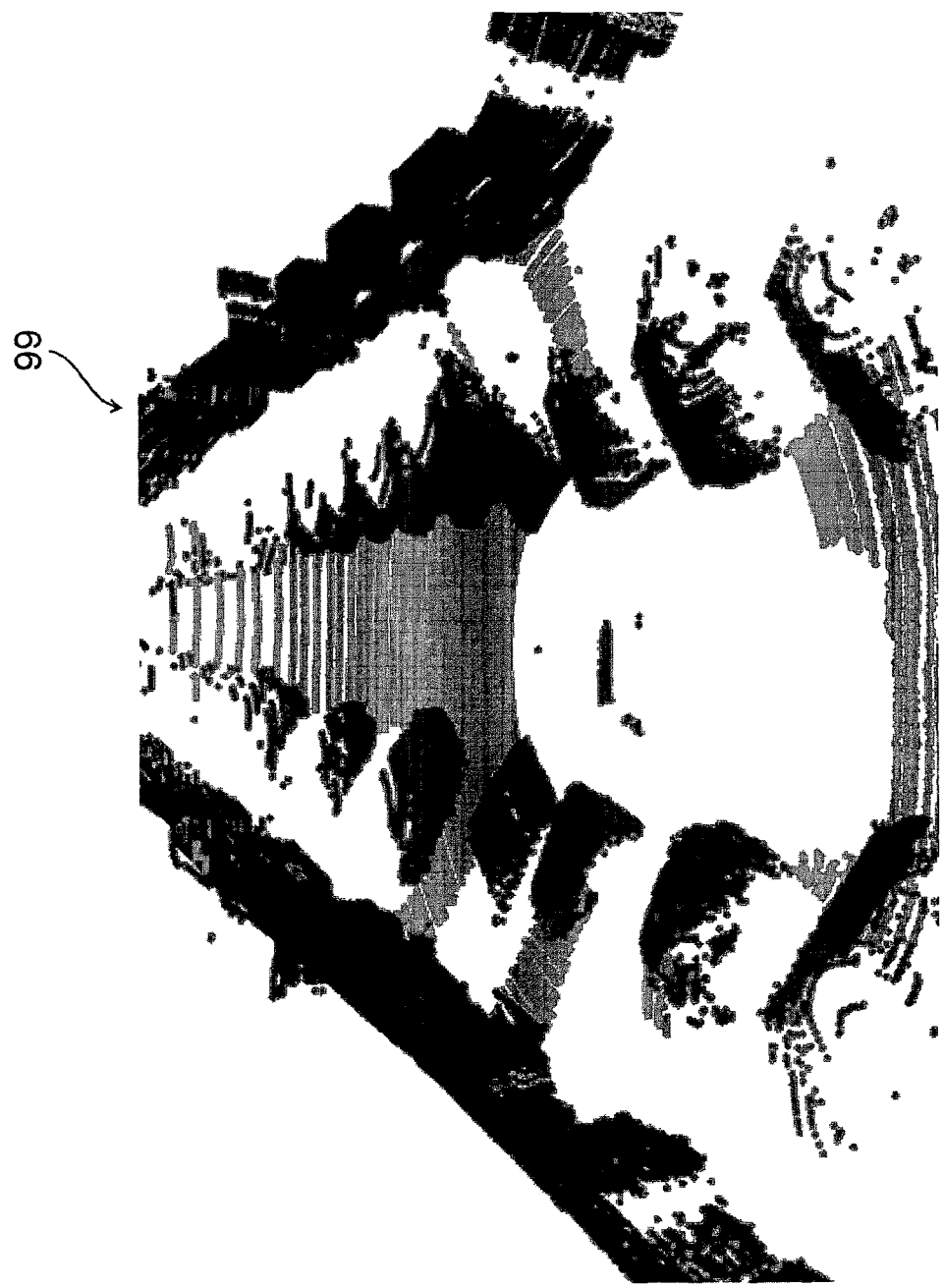
FIG. 22 is a drawing of a point set corresponding to a scene, where the scene comprises numerous object shapes.

The remaining cells are listed in the category of short objects. These cells preferably comprise projected object shape subsets corresponding to vehicles and human figures. These object shapes could be dynamic and static, which characteristic may be determined on the basis of the further levels of the time series of the point set corresponding to a scene. Each cell corresponding to the category of tall objects or short objects is preferably re-listed in the ground category, if the height value of the points corresponding to the given cell is higher by up to a low value, by way of example by 15 cm than the average height value of the neighbouring ground category cell. FIG. 22 shows the dividing of the point set corresponding to a scene 99 into categories; each category is displayed with a different colour shade.

On the basis of the discussion above, in an embodiment of the method according to the invention, the points of the point set 99, 101, 111 corresponding to a scene are listed in the ground category, tall object category, short object category and rare regions category, on the basis of the height value of the points. The points listed in the rare regions category are removed from the point set 99, 101, 111 and by classifying the points listed in the ground category and tall object category as a background point set, and the points listed in the short object category as a foreground point set, the point set 99, 101, 111 is divided into a foreground point set and a background point set.

In some embodiments of the invention, the time series of the point set corresponding to a scene is generated by a scanning device, which has been in different places when recording the various point sets, i.e. the time series of the point set corresponding to a scene is generated in a way that the scanning device is moved. Such a situation can be conceived for example if the scanning device is fitted on top of a vehicle, and during the movement of the vehicle the members of the time series of the point set are recorded on an ongoing basis. In such cases, at least in one part of the members of the time series of the point set corresponding to a scene, a so-called point set registration is carried out, i.e. the point sets coming from various points are transformed to a common co-ordinate system, and through this a registered point set is established. The transformation to the common co-ordinate system is preferably performed on the basis of the points projected to cells listed in the category of tall objects, by means of the Normal-Distributions Transform applied to these points (Magnusson, M.: The Three-Dimensional Normal-Distributions Transform, an Efficient Representation for Registration, Surface Analysis, and Loop Detection, *PhD thesis, Örebro University* (2009)). After projection to the common co-ordinate system, a dense point set is obtained about the scene, but in order to be used at a later stage, the time stamp of each point may also be recorded in the point set obtained by registration.

The various parts of FIG. 23 illustrate a point set registration. On the left side of the figure, point set details coming from subsequent time levels are depicted, which given part of the scene comprises vehicles, too. In the top middle part of the figure, a combined point set obtained by the registration of thirty point sets about the relevant part of the scene is shown. It can be seen that by the registration of the point sets, the quality of information obtainable from each object shape has been substantially improved, and the registered point set subset corresponding to the static type of object shapes is much denser than the object shape subsets shown on the left hand side. This means that to the static object shapes, in such a way, a very high resolution combined object shape subset may be assigned in the point set.

FIG. 23 also shows further steps of the method according to the invention. In the middle part of the figure, the separation of the object shape subsets is shown on the basis of the projected object shape subsets, and to the right side the re-projection of the projected object shape subsets is illustrated. In the drawing on the right hand side of the figure, the object shape subsets corresponding to each object shape can be observed.

FIG. 23 shows that the object shapes may be corresponding e.g. to vehicles, too. On the basis of optical recordings, even for vehicles the three-dimensional model of their substituting object shapes can be made, by which the appropriate vehicle associated object shape subsets may be substituted. In such a way, a combined three-dimensional model of the scene can be generated, in which object shape subsets corresponding to vehicles and/or object shape subsets corresponding to human figures are substituted by substituting three-dimensional models made on the basis of optical recordings.

The points corresponding to the vegetation may be assigned as described above, and separated from the point set corresponding to a scene. The separation of the vegetation associated points of a point set 101 is shown in FIG. 24. Corresponding to relatively rare point set parts, the foliage of many trees is shown in the figure. Furthermore, the figure also depicts object shape subsets corresponding to parking vehicles.

In the following discussion, separation of at least one object shape subset is described on the basis of a further embodiment of the invention. As a basis of the present procedural step, the registered point set obtained as described above is used. The points of the applied registered point set are divided among the categories, and the points are preferably re-projected to their original place, as shown also by the drawing in the upper part of FIG. 23. From the registered point set, on the basis of the categorising described above, the points corresponding to the ground category and tall object category cells are removed. Thereby, the object shapes and the groups of closely contacting object shapes appear as point groupings which are contiguous, but located separately from other parts of the point set, and they comprise one or more object shape subsets. The point groupings are obtained by the so-called recursive flood-fill method. The two-dimensional version of the recursive flood-fill method is described in the technical book by László Szirmay-Kalos: Számitógépes grafika (Computer aided graphics), *Computerbooks* (1999). Regarding spatial point sets, the recursive flood-fill method can be generalised, if during the procedure spatial neighbouring points are examined instead of neighbouring pixels assumed in two dimensions.

In some embodiments of the invention, at least one object shape subset is determined from the foreground point set by the three-dimensional recursive flood-fill method according to the following. The recursive flood-fill method is used for the points listed in the short object category. Assuming that in the point set part already comprising short objects only, a contiguous point group is corresponding to an object shape, a core point is used as the starting point, and then the neighbours located within a given radius of the given point are added. Next, the flooding is continued from the neighbours of the core point, i.e. the not yet examined neighbours thereof are also added to the object shape subset and so on. This recursion stops when the point just added to the given object shape subset does not have such a point within its given radius which has not already been added earlier to the subset.

If the flood-fill method is preferably applied also for the point set parts listed in the tall object category, pedestrians walking very closely to the walls will not melt into the buildings to be reconstructed later.

Since the moving object shapes result in a large blurred subset in the tied point set, several different objects would be linked erroneously due to the movement according to the discussion above. To avoid this, in an embodiment of the invention, the flood-fill method takes into consideration the time stamp information assigned to each point: concerning a given point, only those neighbours are assigned to the given object shape subset, the time stamp of which only differs by up to a few, preferably 0 to 3 time levels. By the tuning of this parameter, the breaking up of the movement can be tuned. According to the discussion above, in the present embodiment of the method according to the invention, on the basis of the time stamps, at least one, stationary shape associated, static combined object shape subset and/or at least one, moving shape associated, dynamic object shape subset is separated in the registered point set.

Object shape subsets obtained by this method are shown in FIGS. 25, 26A and 26B. FIG. 25 illustrates a moving object shape on each of the time levels. On the different time levels, object shape subsets 100a, 100b, 100c are associated one by one with the given object shape. FIG. 25 shows also weighted centres 102a, 102b and 102c of the object shape subsets 100a, 100b, 100c. In the present embodiment of the invention, from the at least one dynamic object shape subset, on the basis of the time stamps, the time series of at least one object shape subset is generated, and in the time series of the at least one object shape subset on the basis of the weighted centres of at least one object shape subset, a trajectory is assigned to the time series of at least one object shape. In the present embodiment, the trajectory is determined differently from the embodiment detailed above, according to which the weighted centres were calculated on the basis of the projected object shape subsets. From the aspect of the further steps of the invention, i.e. from the aspect of substituting the three-dimensional model of the substituting object shape, it does not have a significance how the trajectory serving as a basis for the fitting of the three-dimensional model was obtained, and it is only to be determined how the three-dimensional model should be fitted to the trajectory (with its point of contact on the ground or with the centre of its volume).

FIGS. 26A and 26B illustrate combined object shape subsets 104, 108 of a stationary object shape, a vehicle. The figures show weighted centres 106a, 106b, 106c calculated on the time levels and weighted centres 110a, 110b and 110c. It can be determined from FIGS. 26A and 26B that one by one the weighted centres 106a-106c and 110a-110c, respectively, are not very much different, and therefore the object shapes corresponding to the subsets 104 and 108 can be considered to be static.

Figure 27:
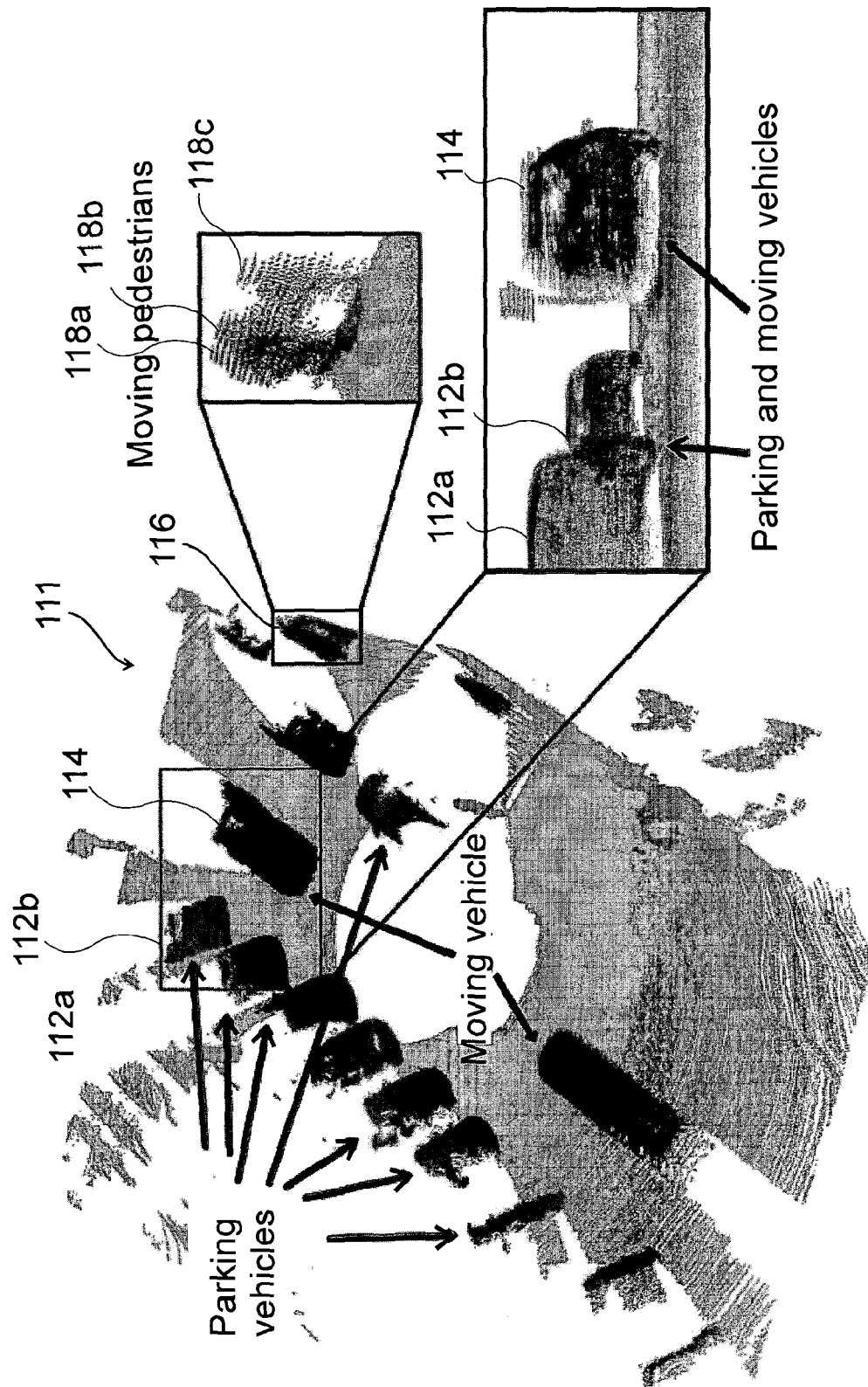
FIG. 27 is a perspective view of a point set corresponding to a scene, where the scene comprises a number of object shapes and some details are enlarged with different view.

On the left hand side of FIG. 27, a point set 111 corresponding to a scene is depicted. FIG. 27 shows combined object shape subsets 112a, 112b, i.e. parking cars, a dynamic object shape subset 114 corresponding to a moving vehicle, and a point set spot corresponding to a human figure. On the right hand side of FIG. 27, the subsets 112a, 112b and 114 corresponding to parking and moving vehicles and the dynamic object shape subset 116 corresponding to a human figure and comprising subsets 118a, 118b, 118c are shown also from a side view. The subsets 118a, 118b and 118c correspond to a moving shape on different time levels.

Figure 28:
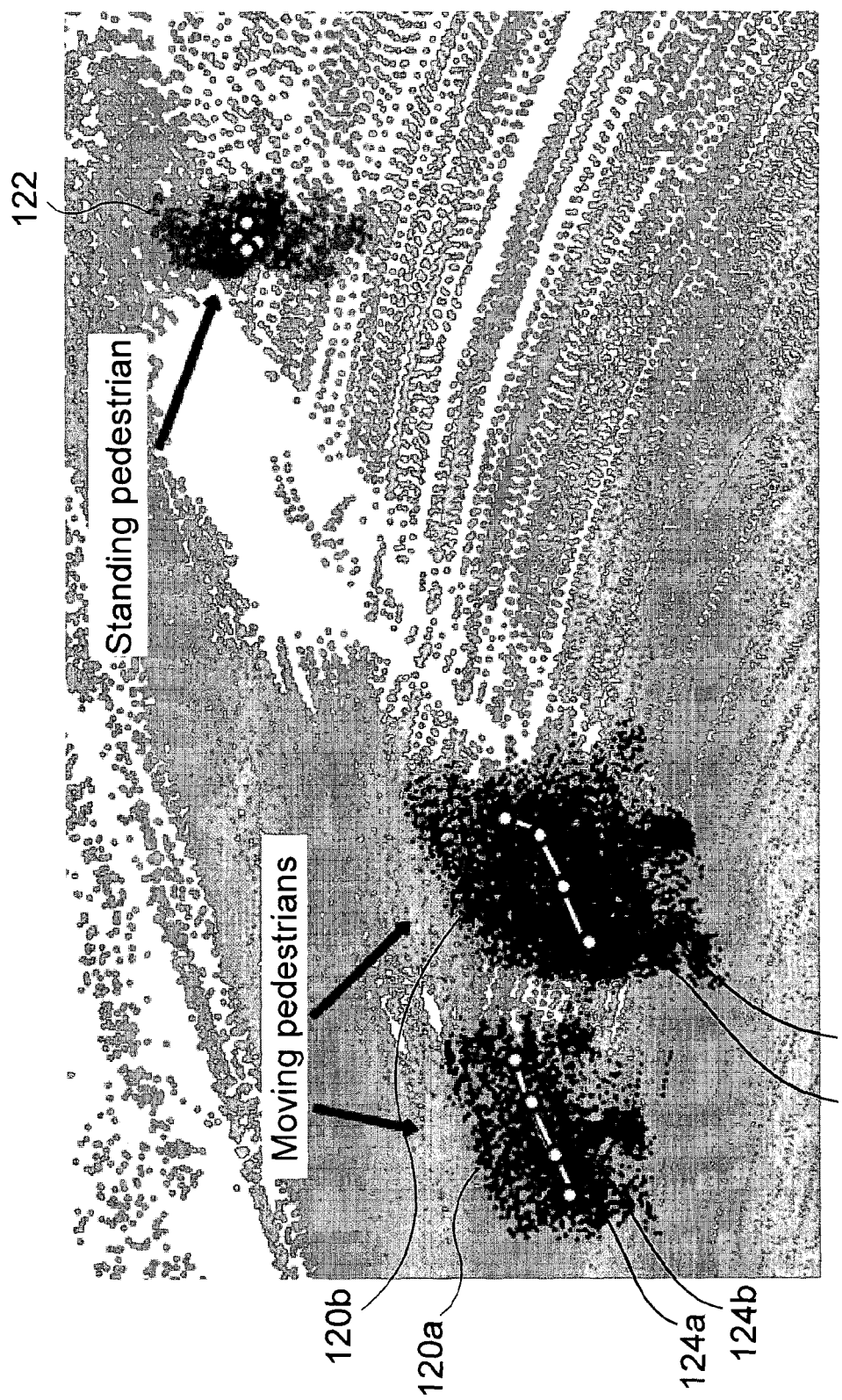
FIG. 28 is a drawing illustrating the displacement of some object shape subsets and the static nature of another object shape.

In FIG. 28, dynamic object shape subsets 120a, 120b corresponds to moving human figures, and combined object shape subset 122 corresponds to a stationary figure. FIG. 28 shows weighted centres 124a, 124b and 126a, 126b, respectively, calculated on different time levels in respect of a moving object shape corresponding to the subsets 120a and 120b, and further weighted centres. On the basis of the weighted centres, the trajectories of the moving object shapes can be determined. The weighted centres shown in the subset 122 are so close to each other that the object shape corresponding to the subset 122 can be considered to be static.

Similarly to the embodiments of the invention shown in FIGS. 4-6, 9A, 9B, 10A, 10B, 11A, 11B, 12-15 and 18-21, again in the embodiments of FIGS. 22 to 28, a time series of the point sets corresponding to the scene have been generated. While, however, in the case of the embodiments depicted by FIGS. 22 to 28 the scanning device is fixed to the top of a vehicle and it records the time series of the point set corresponding to a scene accordingly from positions which are displaced to each other, on the contrary, in the embodiment shown in FIGS. 4-6, 9A, 9B, 10A, 10B, 11A, 11B, 12-15 and 18-21, the location of the scanning device is unchanged during the recording of the time series of the point set corresponding to a scenes. In the latter case, the different time levels of the point set corresponding to a scene can be assigned to each other in a more simple way, but we have shown above that even when the scanning device is moved, the registration of the time levels of the point set corresponding to a scene can be performed.

Some embodiments of the invention cover a system which serves for generating a three-dimensional model. The system according to the invention comprises a scanning device adapted for generating a point set corresponding to a scene comprising at least one object shape, a point set dividing module adapted for dividing the point set corresponding to the scene into a foreground point set corresponding to the foreground of the scene, and comprising at least one object shape subset of the point set corresponding to the scene, and into a background point set corresponding to the background of the scene, an object shape subset dividing module adapted for dividing the foreground point into each of at least one object shape subset corresponding to the at least one object shape, a background modelling module adapted for generating a background three-dimensional model on the basis of the background point set, an optical model-generating module adapted for generating from the optical recordings a three-dimensional model of at least one substituting object shape assignable to each of the at least one object shape, and a model combining module adapted for generating a combined three-dimensional model on the basis of the background three-dimensional model and the three-dimensional model of at least one substituting object shape substituting each of the at least one object shape subset, respectively.

In some embodiments, the system according to the invention comprises at least one short-term assignment (STA) module adapted for determining at least one trajectory, and shown in details above. In further embodiments of the system it comprises, in the case of at least two trajectories, a long-term assignment (LTA) module also presented in details above, and suitable for determining and linking the corresponding trajectories.

In some embodiments of the system according to the invention, the optical recordings are made in an optical studio. In the further embodiments of the system according to the invention, the scanning device is a laser scanner, preferably a rotary head laser scanning device.

The invention is, of course, not limited to the preferred embodiments described in details above, but further variants, modifications and further developments are possible within the scope of protection defined by the claims.

The invention claimed is:

1. A method for generating a three-dimensional model, comprising:
   generating a time series of scene point sets corresponding to a scene comprising an object shape;
   dividing each scene point set of the time series of scene point sets into:
   a foreground point set corresponding to a foreground of the scene and comprising an object shape subset of points corresponding to the object shape, and a background point set corresponding to a background of the scene;

separating a time series of the respective object shape subsets from the time series of foreground point sets;

generating a background three-dimensional model on the basis of one or more of the background point sets;

generating, from optical recordings, a dynamic three-dimensional model of a substituting object shape assignable to the object shape;

generating a combined three-dimensional model on the basis of the background three-dimensional model and the dynamic three-dimensional model substituting each member of the time series of object shape subsets;

classifying one or more points of the scene point sets on the basis of height values of the points into one of a ground category, a tall object category, a short object category, and a rare regions category; and removing the points classified in the rare regions category from the scene point sets, wherein the dynamic three-dimensional model is multiplied to a length corresponding to a movement of the object shape along a trajectory of the object shape, and each scene point set is divided into the foreground point set and the background point set by assigning the points classified in the ground category and the tall object category to the background point set, and by assigning the points classified in the short object category to the foreground point set.

2. A method for generating a three-dimensional model comprising:

generating a time series of scene point sets corresponding to a scene comprising an object shape using a scanning device in a given location;

dividing each scene point set of the time series of scene point sets into:
    a foreground point set corresponding to a foreground of the scene and comprising an object shape subset of points corresponding to the object shape, and
    a background point set corresponding to a background of the scene;

separating a time series of the respective object shape subsets from the time series of foreground point sets;

generating a background three-dimensional model on the basis of one or more of the background point sets;

generating, from optical recordings, a dynamic three-dimensional model of a substituting object shape assignable to the object shape;

generating a combined three-dimensional model on the basis of the background three-dimensional model and the dynamic three-dimensional model substituting each member of the time series of object shape subsets;

after the division of each scene point set into the foreground point set and the background point set, generating a topographic model by modelling topographic features of the scene;

generating a projected foreground point set by projecting the foreground point set onto the topographic model;

generating a projected object shape subset of points corresponding to the object shape by dividing the projected foreground point set using shape filtering or dimensional fitting;

determining the object shape subset on the basis of the projected object shape subset;

determining a time series of location points of the object shape on the topographic model on the basis of the projected object shape subset, and determining a trajectory of the object shape on the basis of the time series of location points wherein the dynamic three-dimensional model is multiplied to a length corresponding to a movement of the object shape along the trajectory of the object shape.

3. The method according to claim 2 wherein the trajectory of the object shape is determined using the Magyar method on the basis of the time series of location points.

4. The method according to claim 2 wherein the trajectory is smoothed.

5. The method according to claim 2 wherein the trajectory of the object shape is one of a plurality of trajectories of object shapes, and further comprising:

recording along each of the trajectories at least one of height values or intensity values of the respective object shapes measured by the scanning device; and assigning and linking one of the trajectories to another trajectory on the basis of the matching at least one of the height values or the intensity values.

6. The method according to claim 5 further comprising:

separating a vegetation subset corresponding to vegetation of the scene point set on the basis of a distance of a given point from at least one of an approximating plane fitted onto topographic features of the scene, an irregular location of the given point, or the intensity value of the given point, and removing the vegetation subset from the scene point set.

7. The method according to claim 2, characterised by selecting as a location point of the object shape a weighted centre of the projected object shape subset corresponding to the object shape.

8. The method according to claim 2 further comprising:

determining the trajectory on the basis of the time series of location points by iteratively:
    assigning a next location point in sequence for the object shape,
    correcting the assigned location point after examination with a Kalman-filter, finalising the corrected location point, and
    making a proposal by means of the Kalman-filter, for the next location point in sequence, for the at least one object shape.

9. A method for generating a three-dimensional model comprising:

generating a time series of scene point sets corresponding to a scene comprising an object shape using a scanning device in a given location;

dividing each scene point set of the time series of scene point sets into:
    a foreground point set corresponding to a foreground of the scene and comprising an object shape subset of points corresponding to the object shape, and
    a background point set corresponding to a background of the scene;

separating a time series of the respective object shape subsets from the time series of foreground point sets;

generating a background three-dimensional model on the basis of one or more of the background point sets;

generating, from optical recordings, a dynamic three-dimensional model of a substituting object shape assignable to the object shape;

generating a combined three-dimensional model on the basis of the background three-dimensional model and the dynamic three-dimensional model substituting each member of the time series of object shape subsets;

generating, by the scanning device, a time series of the scene point sets by moving the scanning device, generating a registered point set by subjecting at least one part of the members of the time series of the scene point sets to point set registration;

assigning time stamps to the members of the time series of scene point sets; and on the basis of the time stamps, separating, in the registered point set, at least one of a static combined object shape subset or a dynamic object shape subset wherein the dynamic three-dimensional model is multiplied to a length corresponding to a movement of the object shape along a trajectory of the object shape.

10. The method according to claim 9 further comprising:

generating, on the basis of the time stamps, a time series of object shape subsets from the dynamic object shape subset; and assigning the trajectory to the object shape in the time series of object shape subsets on the basis of weighted centres of the object shape subsets.

11. A system for generating a three-dimensional model, comprising:

a scanning device adapted for generating a time series of scene point sets corresponding to a scene comprising an object shape, a point set dividing module adapted for dividing each scene point set of the time series of scene point sets into:

a foreground point set corresponding to a foreground of the scene and comprising an object shape subset of points corresponding to the object shape, and a background point set corresponding to the background of the scene; and an assignment module adapted for:

classifying one or more points of the scene point sets on the basis of height values of the points into one of a ground category, a tall object category, a short object category, and a rare regions category, and removing the points classified in the rare regions category from the scene point sets;

an object shape subset dividing module adapted for separating a time series of the respective object shape subset from each foreground point set;

a background modelling module adapted for generating a background three-dimensional model on the basis of one or more of the background point sets;

an optical model-generating module adapted for generating, from optical recordings, a dynamic three-dimensional model of a substituting object shape assignable to the object shape;

a model combining module adapted for generating a combined three-dimensional model on the basis of the background three-dimensional model and the dynamic three-dimensional model substituting each member of the time series of object shape subsets, wherein the dynamic three-dimensional model is multiplied to a length corresponding to a movement of the object shape along a trajectory of the object shape, and each scene point set is divided into the foreground point set and the background point set by assigning the points classified in the ground category and the tall object category to the background point set, and by assigning the points classified in the short object category to the foreground point set.

\* \* \* \* \*